United States Patent
Lykkegaard

(10) Patent No.: US 6,533,106 B1
(45) Date of Patent: *Mar. 18, 2003

(54) CONVEYOR

(75) Inventor: Uffe Lykkegaard, Arhus c (DK)

(73) Assignee: Crisplant a/s, Arhus N (DK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/222,959

(22) Filed: Dec. 30, 1998

(30) Foreign Application Priority Data

Dec. 30, 1997 (DK) ............................................... 1556/97
Oct. 20, 1998 (DK) ............................................. 01343/98

(51) Int. Cl.⁷ ............................................... B65G 17/18
(52) U.S. Cl. ..................... 198/800; 198/798; 198/475.1
(58) Field of Search ........................... 198/800, 475.1, 198/798; 211/121, 122

(56) References Cited

U.S. PATENT DOCUMENTS

| | | | |
|---|---|---|---|
| 1,240,172 A | * | 9/1917 | Breneman |
| 1,270,001 A | * | 6/1918 | Boos et al. ................... 198/800 |
| 1,643,224 A | * | 9/1927 | Shelton ....................... 211/121 |
| 1,931,141 A | * | 10/1933 | Caesar et al. |
| 2,078,770 A | * | 4/1937 | Morton |
| 2,339,494 A | * | 1/1944 | Lubahn ....................... 198/800 |
| 2,912,118 A | * | 11/1959 | Behrens et al. .............. 211/121 |
| 3,062,358 A | * | 11/1962 | Woodward ................... 198/800 |
| 3,298,536 A | * | 1/1967 | Zippel ......................... 211/121 |
| 3,655,031 A | * | 4/1972 | Cahn ........................... 198/800 |
| 4,067,437 A | * | 1/1978 | Frantl et al. ................. 198/800 |
| 4,171,042 A | * | 10/1979 | Meissner ..................... 198/386 |
| 4,199,291 A | * | 4/1980 | Winiasz et al. .............. 198/479 |
| 4,278,165 A | * | 7/1981 | Nielsen et al. ............... 198/365 |
| 4,493,414 A | * | 1/1985 | Nevo-Hacohen ............ 198/800 |
| 4,729,466 A | | 3/1988 | Bollier et al. |

(List continued on next page.)

FOREIGN PATENT DOCUMENTS

| | | |
|---|---|---|
| AT | 347333 | 12/1978 |
| BE | A51005757 | 1/1994 |

(List continued on next page.)

OTHER PUBLICATIONS

Patent Abstract of Swedish Publication No. 9202674–9; published Apr. 19, 1993.
Patent Abstract of Soviet Union Publication No. 865–721; published Sep. 28, 1981.

Primary Examiner—Robert P. Olszewski
Assistant Examiner—Steven B. McAllister
(74) Attorney, Agent, or Firm—Birch, Stewart, Kolasch & Birch, LLP

(57) ABSTRACT

A conveyor transports lightweight articles with a high degree of adaptability to the space it can occupy and the path along which the conveyor units can travel. The track of the conveyor has curving track sections connecting straight track sections having opposite transport directions and the individual conveyor unit comprises guide members that engage with stationary guides to prevent the article supporting member of the unit from tilting when passing straight as well as curving track sections. The article supporting members of the units are arranged between the main track and the stationary guides when the units are moving along the curving main track section. In particular, each unit may have first and second guiding members to prevent tilting of the article supporting member at curving and straight track sections, respectively, and both guiding members co-operate with their respective guides over a certain distance when the unit enters and leaves a curving track section.

18 Claims, 20 Drawing Sheets

U.S. PATENT DOCUMENTS

| | | | |
|---|---|---|---|
| 4,733,768 A | | 3/1988 | Aquino et al. |
| 4,987,992 A | * | 1/1991 | Pfleger ....................... 198/800 |
| 5,090,552 A | | 2/1992 | Fukuyama et al. |
| 5,101,963 A | * | 4/1992 | Skarlupka et al. .......... 198/800 |
| 5,207,314 A | * | 5/1993 | Ueda et al. ................. 198/800 |
| 6,119,880 A | * | 9/2000 | Dueck ........................ 198/798 |

FOREIGN PATENT DOCUMENTS

| | | |
|---|---|---|
| DE | 1240503 | 5/1967 |
| DE | 2100056 | 7/1972 |
| DE | 2148778 | 4/1973 |
| DE | A13032032 | 4/1982 |
| DE | A14002665 | 8/1991 |
| DE | C24-446779 | 6/1996 |
| EP | A10636561 | 2/1995 |
| EP | A10662433 | 7/1995 |
| EP | A10683118 | 11/1995 |
| FR | 2374235 | 7/1978 |
| JP | 4-12930 | 1/1992 |
| JP | 5-62727 | 5/1995 |
| SE | 7007531-2 | 10/1974 |
| SU | 865721 | 9/1981 |
| WO | A181/00393 | 2/1981 |
| WO | A194/10003 | 5/1994 |
| WO | A196/20526 | 7/1996 |
| WO | A297/16363 | 5/1997 |

* cited by examiner

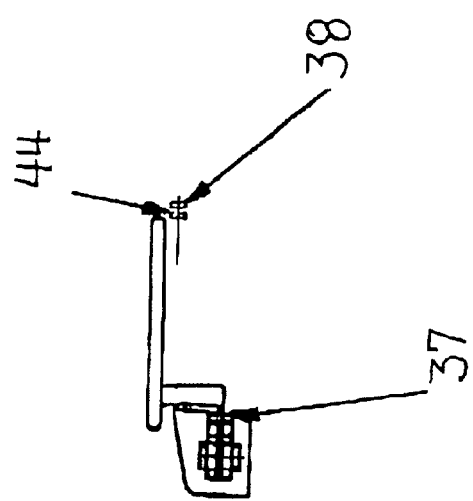
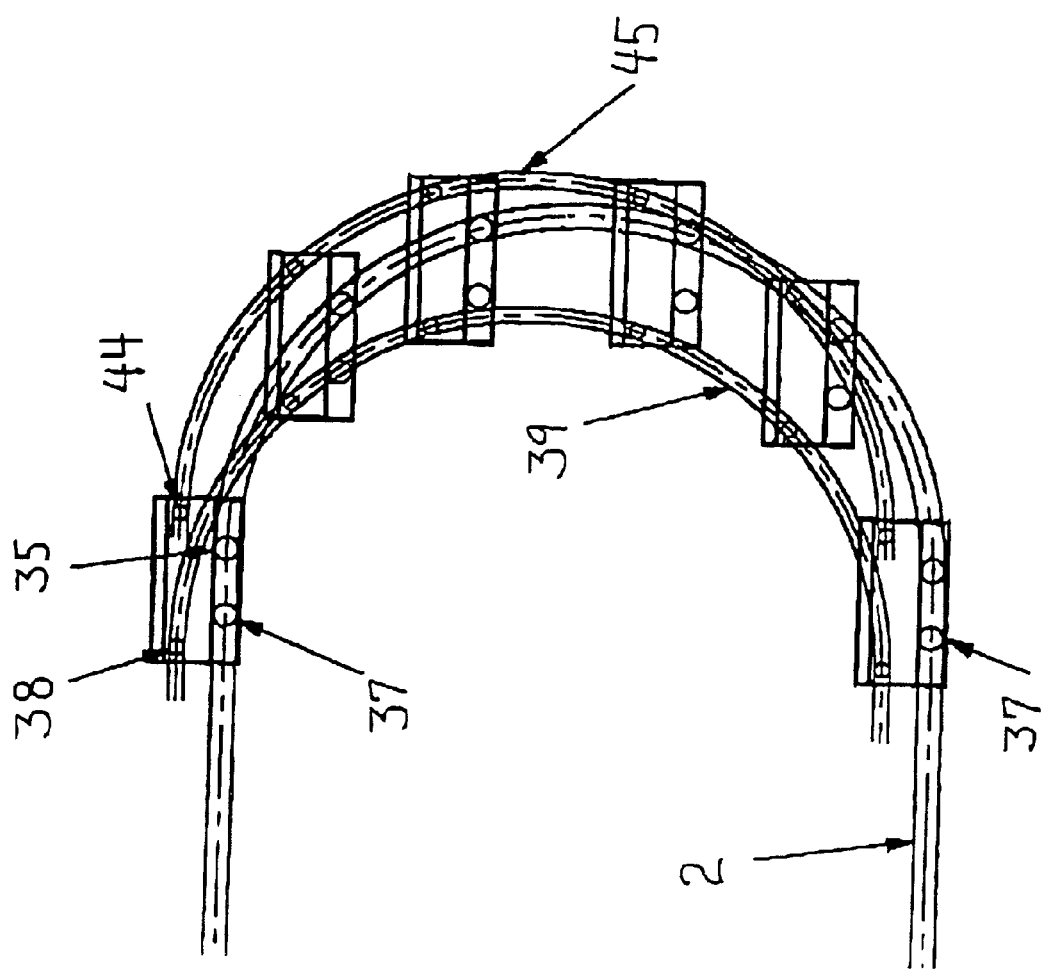

CONVEYOR

The present invention relates to a conveyor for transporting articles such as letters, mail parcels, CDs, and other types of articles, in particular articles of a relatively light weight such as, e.g., of a maximum weight of about 8 kg, in particular a maximum weight of about 5 kg (although it will be understood that the principles of the invention can be utilized also in connection with articles of a higher weight than about 8 kg). In particular, the invention relates to a conveyor which allows a high degree of adaptability to requirements or constraints with respect to the space it can occupy and the path along which the conveyor units can travel.

BACKGROUND OF THE INVENTION

Conveyors for letters, mail parcels, CDs, videotapes, books and other relatively light articles should be designed so that they can relatively easily be installed and operated under widely varying space conditions, both with regard to the amount of space the conveyors can occupy and with respect to the three-dimensional configuration of the space available. Examples of conveyors in which the conveyor units are capable of travelling along a curving path extending between different vertical positions appear from AT Patent No. 347.333 and Swedish published patent application No. 92,026,749-9.

DISCLOSURE OF THE INVENTION

The present invention relates to such conveyors that are highly flexible with respect to their installation and operation and which permit the conveyor units thereof to follow paths in any desired direction; which can be installed and operated in a space comprising more than one floor and/or on walls; in which a loading station can be installed directly above or directly under a discharge station, and/or loading stations or discharge stations can be installed directly above each other; and which can be made economically and yet deliver a highly efficient and flawless operation.

The conveyor according to the invention comprises a plurality of conveyor units, an endless carrier means, such as a chain, to which each conveyor unit is connected, an endless main track in which the carrier means is moving in a transport direction, said track comprising at least a first substantially straight main track section, a second substantially straight main track section, and a curving main track section being connected at a first end to the first main track section and at a second end to the second main track section, the first and second main track sections being arranged in two planes in a vertical level so that their respective transport directions are of opposite direction, each conveyor unit being connected pivotally to the carrier means so as to allow the conveyor unit to pivot relatively to the chain about a main axis of the conveyor unit, each conveyor unit comprising an article-supporting member that extends away from the vertical plane of the carrier means, a first guide member of the conveyor unit, and first guiding means arranged in a vertical plane being parallel to the vertical plane of the carrier means and adapted to co-operate with the first guide member of each of said plurality of conveyor units when the conveyor unit moves along at least a part of the at least one curving section of said main track, so as to counteract or prevent the article supporting member from tilting from its position relative to the horizontal plane, the article supporting members of the conveyor units being arranged between the vertical plane of the first guide member and the first guiding means and the vertical plane of the carrier means when the conveyor units are moving along said curving main track section.

The first and the second main track sections will normally be horizontally oriented. The endless carrier means is normally, and in most cases preferably, a chain, but also other means, such as, e.g., a toothed belt or an endless series of connected carriages, which are capable of carrying the conveyor units in the manner disclosed herein are contemplated.

The main axis of each conveyor unit is preferably horizontal or substantially horizontal. In most cases, it will also be preferred that the main axis of each conveyor is substantially perpendicular to the transport direction.

The pivotal connection of each of the conveyor units with its article-supporting member, e.g. a cross-belt unit, extending away from the vertical plane of the carrier means permits a design where sections of the track can be mounted in an open space or on a wall as desired. Curvature of the track in a vertical direction, e.g. a vertical loop connecting two substantially straight track sections and reverting the direction of the track, can be compensated for by the conveyor units pivoting around their main axis, the maintaining or substantially maintaining the article-supporting member, e.g. a cross-belt unit, in its position relative to the horizontal plane, normally a position where the article-supporting surface of the member is horizontal, being achieved through the engagement of the guide member with the first guiding means. In most embodiments, the first guiding means will extend substantially parallel to at least a part of the main track. The first guiding means may in itself be a track with which the first guide member of each carrier unit engages, or it may comprise, e.g., protrusions such as pins or bars, which move along a path which normally extends substantially parallel to at least a part of the main track and which engage with the first guide member of each conveyor unit.

Torque-absorbing means may preferably be arranged in substantially the same vertical plane as the carrier means. This means that the torque-absorbing means will normally not extend further from the main track, normally in the direction opposite to the article-supporting member, than four times the breadth of the main track, preferably not further than three times and more preferred not further than twice the breadth of the main track. In an illustrative, but presently not preferred embodiment, the torque-absorbing means could be a relatively heavy counterweight placed on the opposite side of the carrier means relative to the article-supporting member of the conveyor unit; the counterweight could be adjustable to compensate for variations of the loading on the article-supporting member, the compensation being performed manually or preferably automatically, e.g. in response to a sensor detecting the angle of the article-supporting member of the conveyor unit relative to the horizontal plane and producing an output signal indicating the detected angle.

In practice, the torque absorbing means preferably constitutes an integrated part of the carrier means, such as, for each conveyor unit, at least one wheel or low friction slide part/slide member/slide shoe connected to or forming part of the carrier means and engaging with a track part, preferably a part of the main track, and co-operating with another engaging member, e.g. another wheel on a common axle, in such a manner that the torque is absorbed while permitting free movement of the total arrangement in the transport direction. An embodiment of such a torque-absorbing means is shown in the figures. It will be understood that in principle, to be comparable to the counterweight example above, such a torque-absorbing means consists of the combination of e.g. the wheel pair on the common axle and the track parts with which each wheel engages, and such a combination and similar combinations are covered by the term "torque absorbing means" herein.

The conveyor according to the invention may further comprise a second guiding means that extends substantially parallel to at least a substantial part of the main track, each conveyor unit comprises a second guide member adapted to co-operate with said second guiding means when the conveyor unit moves along at least a substantial part of straight sections of said main track, the second guiding means and the second guide members when co-operating are adapted to counteract or prevent the article-supporting member from tilting from its position relative to the horizontal plane.

To reduce the risk of tilting or instability in the transition from a straight to a curved main track section or vice versa, the first and second guide members of each conveyor unit and the first and second guiding means are preferably adapted so that the first guide member co-operates with the first guiding means when the conveyor unit enters the curving main track section and before the second guide member disengages with the second guiding means and so that the second guide member co-operates with the second guiding means when the conveyor unit leaves the curving main track section and before the first guide member disengages with the first guiding means. It will be understood that in some embodiments, the function of the second guide member can be performed by the first guide member so that both the first and the second guide members are constituted by one and the same guide member.

The second guide member and the second guiding means are preferably arranged in substantially the same vertical plane as the carrier means or in a vertical plane closely adjacent to said plane.

To further improve the stability when the first guide member travels through such parts of the first guiding means whose path may geometrically allow movement of the first guide member along their tangent (which means that in this situation there is no well-defined position of the first guide member in the first guiding member), the first guide member of at least one conveyor unit and preferably of all the conveyor units may comprise two wheels arranged in substantially the same vertical plane with a spacing between them and arranged pivotally on a bar which is arranged on the conveyor unit such that said bar is allowed to pivot about a third axis that extends substantially midway between and substantially parallel to the axes about which said two wheels are allowed to pivot, said third axis being substantially parallel to the first axis of the conveyor unit, the first, second and third axes of the conveyor unit being arranged with a spacing between each axis, and the first guiding means comprising a track protruding from a vertical plane and comprising two parallel surfaces with which said two wheels engage with said track in between said two wheels when the first guide member engages with the first guiding means. At least one of said two wheels of the first guide member is advantageously resiliently biased against said track of the first guiding means when the first guide member engages with the first guiding means.

It will be understood that the above stability-increasing embodiment may be generalized to other designs which further increase the stability of the movement of the conveyor units by increasing the degree of definition with which the respective guide members engage with their guiding means.

In order to further increase the stability of the conveyor, it may comprise a third guiding means arranged in substantially in the same vertical plane as the first guiding means, each conveyor unit comprises a third guide member adapted to co-operate with said third guiding means, the second and third guiding means being adapted so that the third guide member co-operates with the third guiding means when the conveyor unit enters the curving main track section and before the second guide member disengages with the second guiding means and so that the second guide member co-operates with the second guiding means when the conveyor unit leaves the curving main track section and before the third guide member disengages with the third guiding means.

Furthermore, the conveyor may comprise a fourth guiding means arranged in substantially in the same vertical plane as the first guiding means, each conveyor unit comprises a fourth guide member adapted to co-operate with said fourth guiding means, the first, third and fourth guiding members of each conveyor unit forming an obtuse-angled triangle in a vertical plane.

In one embodiment according to the invention, the conveyor comprises first, second and third guide members of each conveyor unit and first, second and third guiding means being adapted so that the first guide member co-operates with the first guiding means when the conveyor unit enters the curving main track section and before the second guide member disengages with the second guiding means, so that the third guide member co-operates with the third guiding means before the first guide member disengages with the first guiding means when the conveyor unit passes a given position along the curving main track section, and so that the second guide member co-operates with the second guiding means when the conveyor unit leaves the curving main track section and before the third guide member disengages with the third guiding means.

In a simple embodiment of the conveyor according to the invention, the first guide member comprises a wheel arranged on the conveyor unit such that said wheel is allowed to pivot about a second axis that forms the center axis of the wheel, said second axis being substantially parallel to the first axis of the conveyor unit and the first and second axes of the conveyor unit being arranged with a spacing between them, the first guiding means comprising a track that extends in the full length of the main track and in which track said wheel is moving, and the path of the track relatively to the main track is adapted to counteract or prevent the article-supporting member from tilting from its position relative to the horizontal plane.

Another embodiment based on the above basic design and having an increased stability compared thereto further comprises a second guiding means, at least one conveyor unit and preferably all conveyor units further comprising a second guide member adapted for engaging with said second guiding means, said second guide member comprising a wheel arranged on the conveyor unit such that said wheel is allowed to pivot about a third axis that forms the center axis of the wheel, said third axis being substantially parallel to the first axis of the conveyor unit and the first, second and third axes of the conveyor unit being arranged with a spacing in between each axis, the second guiding means extending substantially parallel to the main track over at least a substantial part of the curving main track section and comprising a track in which said wheel of the second guide member is moving, the path of the track of the second guide means relatively to the main track being adapted to counteract or prevent the article-supporting member from tilting from its position relative to the horizontal plane.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE FIGURES

The present invention will become more fully understood from the detailed description given hereinbelow and the accompanying drawings which are given by way of illustration only, and thus are not limitative of the present invention, and wherein:

FIG. 15 is a side view of a third embodiment of arrangements for preventing the conveyor units from tilting when passing a vertical half-turn of the main track;

FIG. 16 is a cross-sectional view of a conveyor unit according to the embodiment of FIG. 15;

DETAILED DESCRIPTION OF THE FIGURES

Figure 1:
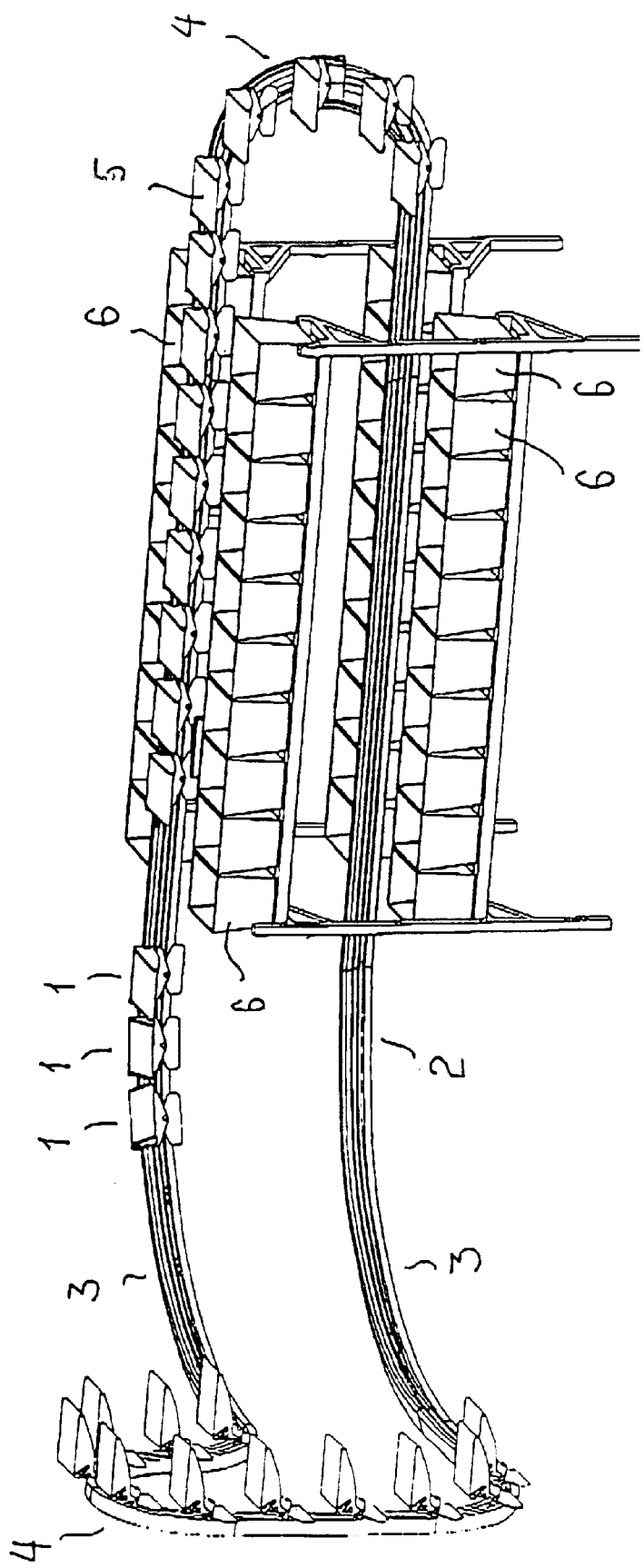
FIG. 1 shows an overview of a conveyor system according to the invention.

An overview of a conveyor system according to a preferred embodiment of the invention is shown in FIG. 1. A carrier means to which the conveyor units 1 are connected moves in an endless main track 2 that have sections 3 that curves in the horizontal plane and section 4 that curves in the vertical plane forming vertical half-turns. For clarity, only a limited number of conveyor units are shown in FIG. 1. An endless belt extending to one side from the vertical plane of the carrier means constitutes the article-supporting surface 5 of each conveyor unit 1. The endless belt or cross-belt may be moved in a direction perpendicular to the transport direction and articles may be discharged to either side of the conveyor unit 1. The article-supporting surface 5 may also be constituted by other devices, such as; e.g., a tray that may be tiltable in both directions.

The control system of the conveyor system is adapted to control the loading of articles onto and discharging of articles from the conveyor system. The conveyor units 1 are label uniquely with an automatically readable identification mark, such as, e.g., a bar code label in order to identify the individual conveyor units 1. The conveyor system further comprises reading means for reading the identification marks at least at one position along the track of the conveyor system, preferably at the loading stations and at the discharge stations 6. A main control unit has means for communicating with the control units of each individual conveyor unit 1 which controls a drive unit on each conveyor unit 1 for driving the endless belt in a given direction to discharge articles from the article-supporting surface 5 at a predetermined discharge station 6.

The conveyor system further comprises means for driving the conveyor units 1, such as, e.g., a linear motor that is driving at least some of the conveyor units, one or more electro-motors driving the carrier means, etc, and it also comprises one or more loading stations for loading articles onto the article-supporting surfaces 5.

A low radius of curvature of the curved main track sections 3, 4 make the conveyor system very flexible and allows for a very high spatial exploitation. The main track sections 4 that form half-turns in the vertical plane allow for discharge stations 5 to be stacked in the vertical direction. However, special arrangements must be made at the vertical half-turns 4 of the main track 2 to prevent the article-supporting surfaces 5 of the conveyor units 1 from tilting so as to prevent the articles transported by the conveyor units 1 from being unintentionally discharged.

Figure 2:
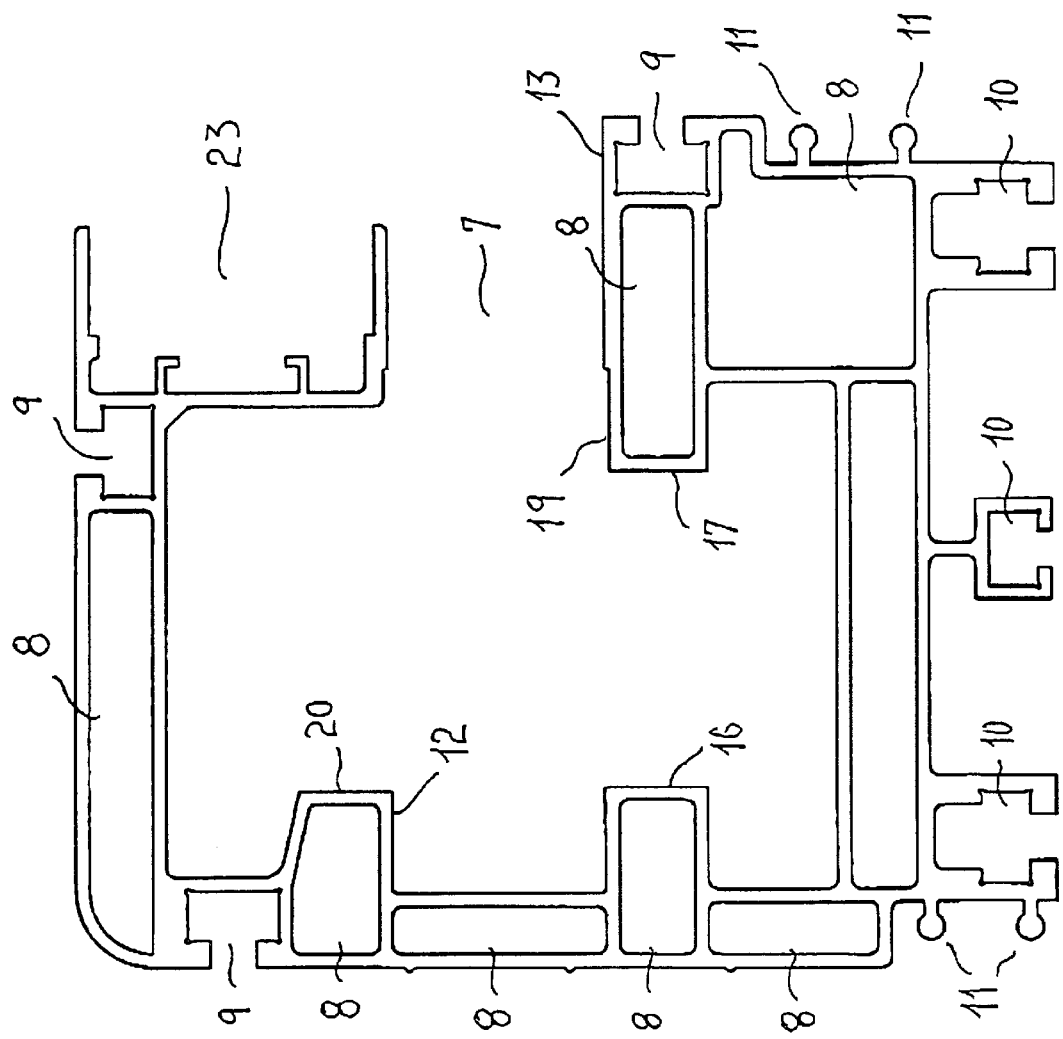
FIG. 2 shows a cross-section of a profile forming the main track.
Figure 3:
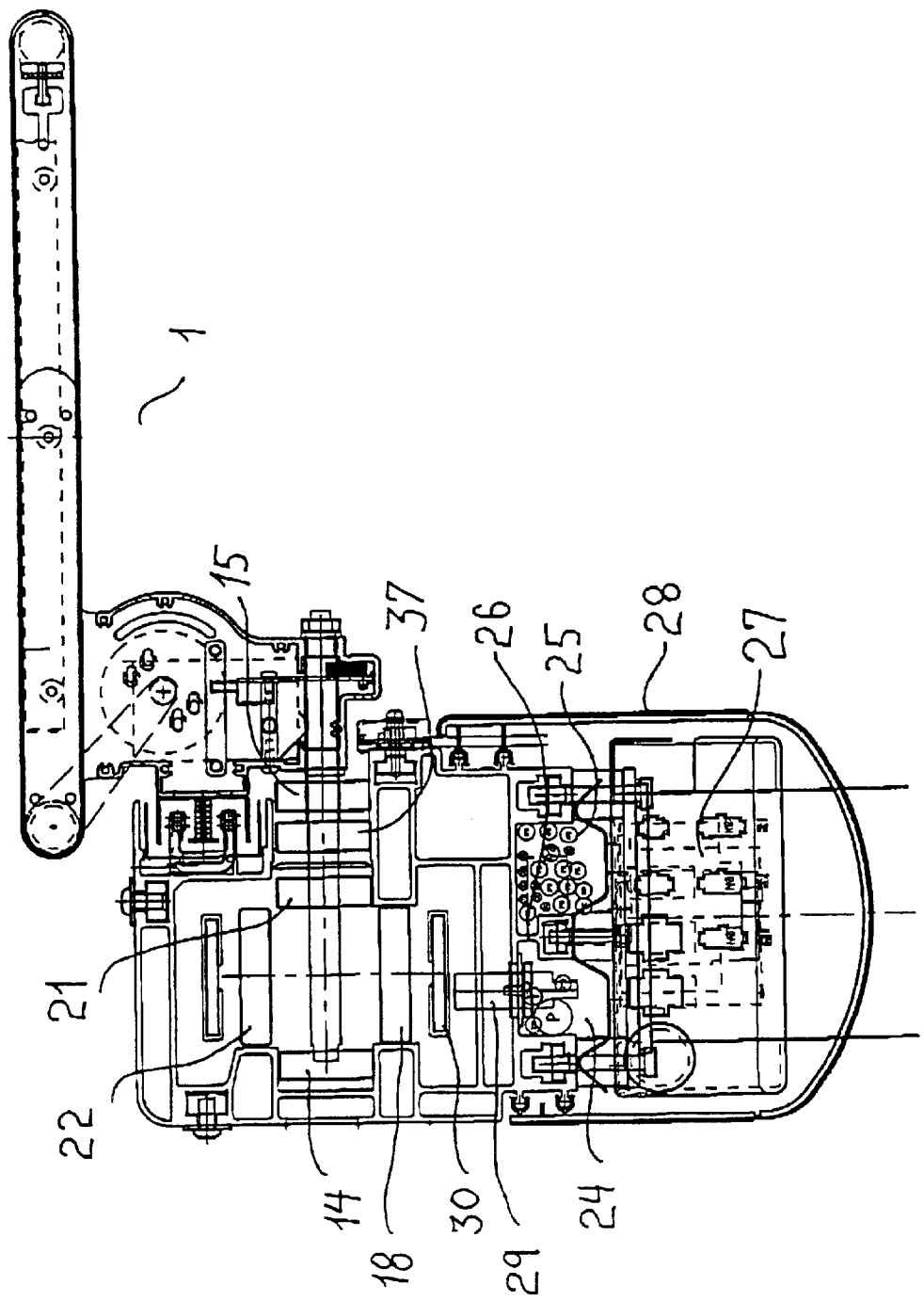
FIG. 3 shows a cross-section of a first embodiment of the main track equipped for operation.
Figure 4:
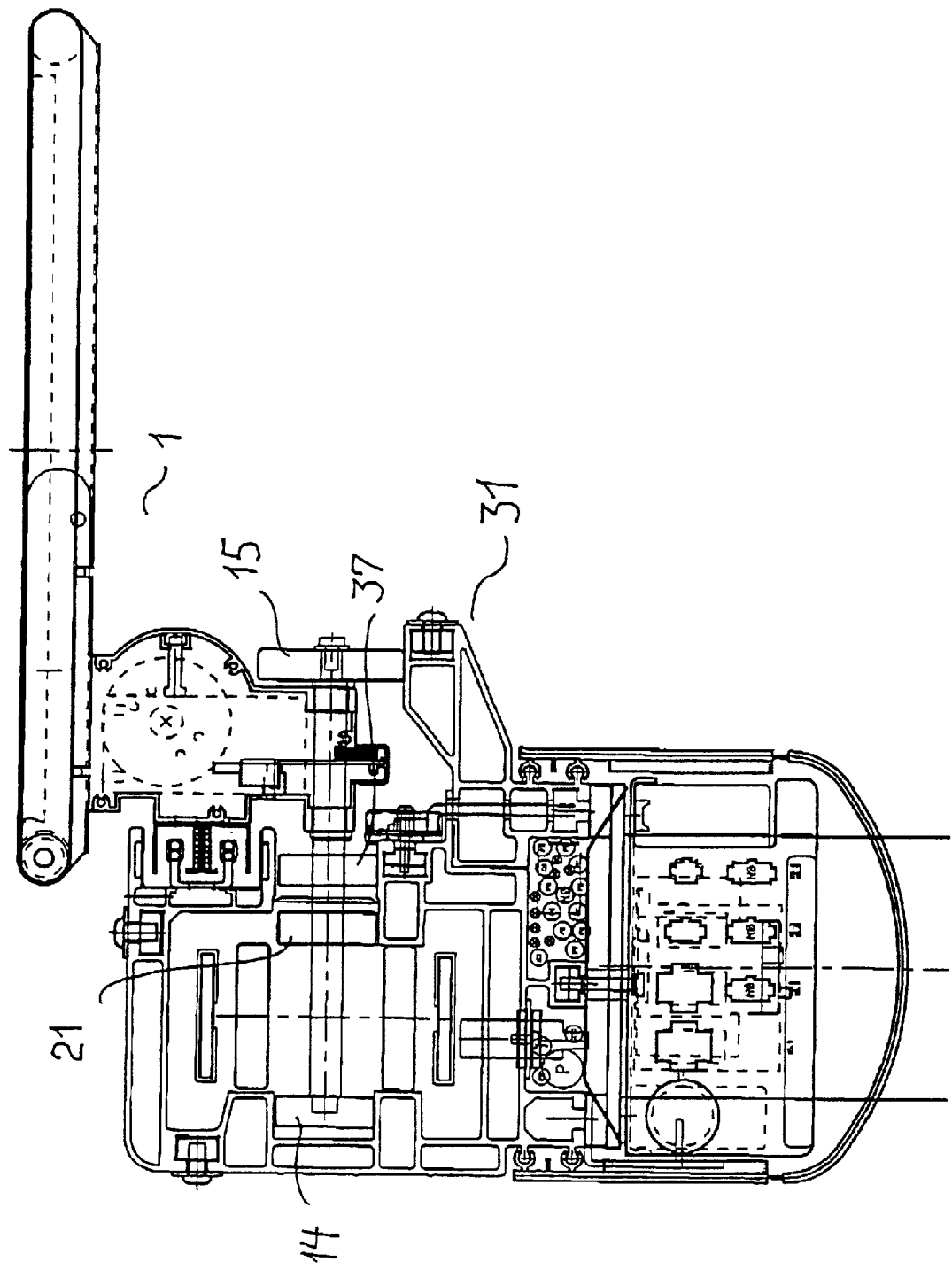
FIG. 4 shows a cross-section of a second embodiment of the main track equipped for operation.
Figure 5:
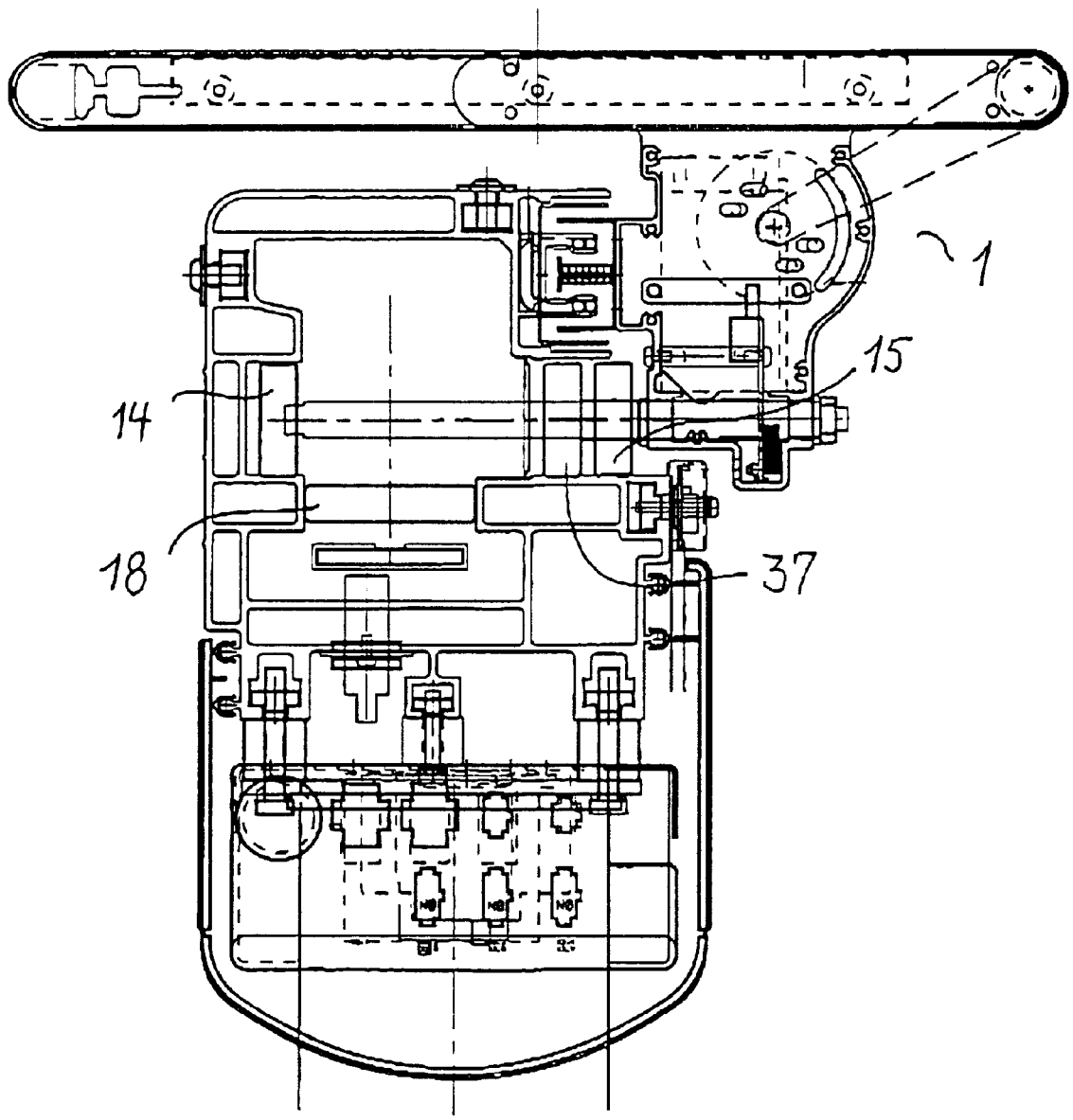
FIG. 5 shows a cross-section of a third embodiment of the main track equipped for operation.
Figure 6:
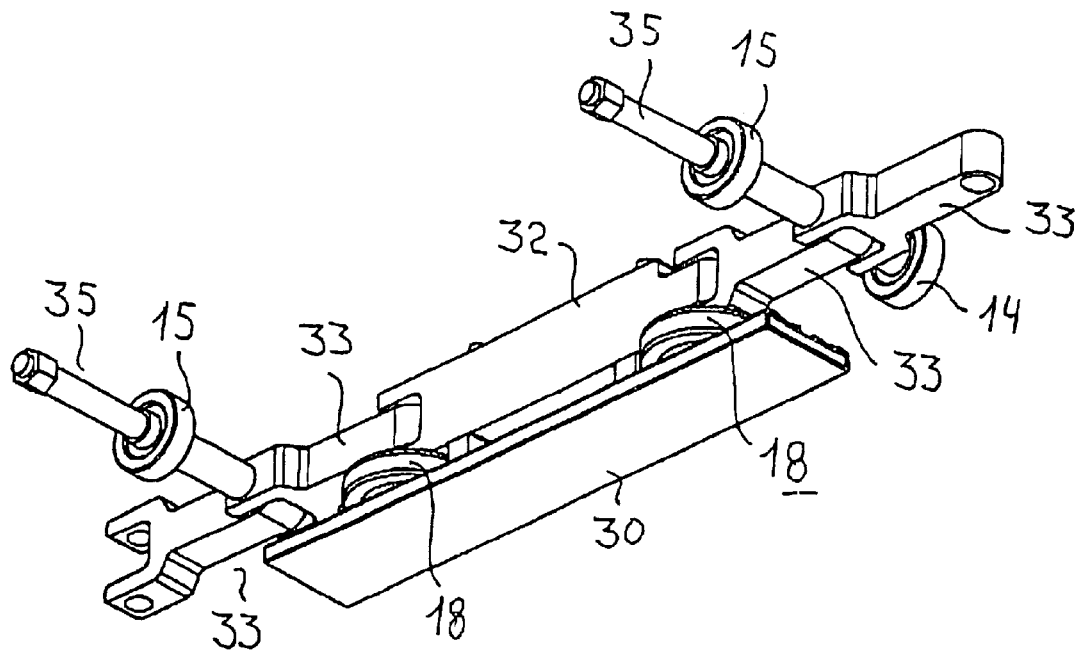
FIG. 6 is a perspective view of a first embodiment of a drive chain as seen partly from below.
Figure 7:
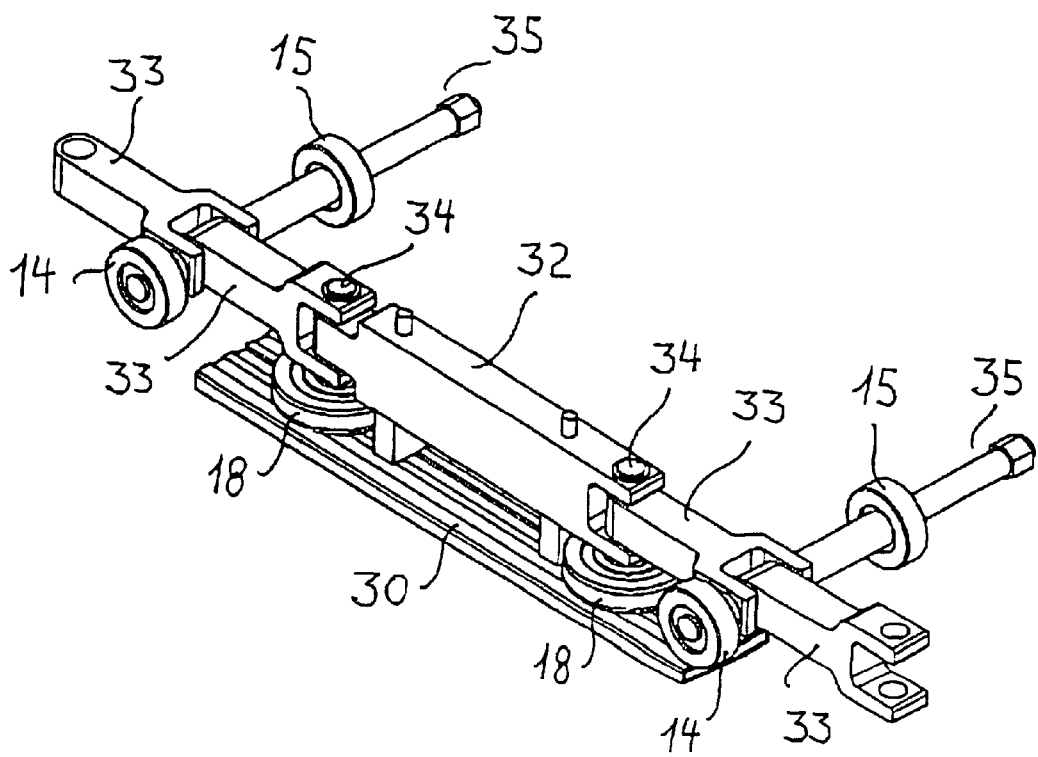
FIG. 7 is a perspective view of a first embodiment of a drive chain as seen partly from above.

The monorail sections forming the main track 2 on straight track sections and track sections curving in the horizontal plane are preferably made from a profile of extruded aluminum. A cross-section of a profile is shown in FIG. 2 and cross-sections of monorails mounted with a conveyor unit 1 and equipped for operation are shown in FIGS. 3–5.

The profile forms a nearly closed room in which the drive chain can move. An opening 7 to one side enables the connection between the drive chain and the conveyor units 1. The opening 7 is small compared to the total circumference of the profile, forming only about a tenth of the circumference so that the profile has a high stiffness about the longitudinal axis. The opening 7 is placed at one side of the profile to prevent dust and other impurities from settling into the interior of the profile and to enable vertical half-turns 4 of the main track 2. A number of cavities 8 are formed within the profile to increase the longitudinal stiffness with low added material consumption. The profile furthermore has grooves 9 for assembling adjacent sections of the main track 2 and grooves 10 for mounting of cabling for power supply to the drive unit and for control of the conveyor and optionally for power supply to the conveyor units 1. A shield for covering the cabling, control and power-supply units, etc. may be mounted on protrusions 11 placed on both sides of the profile.

Surfaces 12, 13 with which the support wheels 14, 15 engage are formed within the profile. The full surface of the profile is anodized after the extrusion for providing such a surface hardness that the aluminum can withstand the wear from the support wheels 14, 15. Surfaces 16, 17 with which the directing wheels 18 may engage are also formed within the profile. The surfaces 19, 20 adjacent to the secondary support wheel 21 and the secondary directing wheel 22 are recessed one millimeter as compared to the similar surfaces 13, 16 adjacent to the support wheel 15 and the directing wheel 18 so that the secondary wheels 21, 22 do not engage under ordinary operation conditions. The different wheels and their intended operation will together with the drive chain be discussed in details later.

The profile has a groove 23 next to the conveyor units 1 in which a stationary part of a cordless energy transfer system may be mounted. The conveyor units 1 may have a demand for a power supply for driving, e.g., a cross-belt, a discharge device for a tilt tray and/or a control unit for controlling the operation of the conveyor unit 1. Energy may be transferred to the conveyor unit 1 by means of a conductor rail on the main track 2 and a collector shoe on each conveyor unit 1 or by means of an inductive energy transfer system with a primary side on the main track 2 and a secondary side on each conveyor unit 1. Alternatively, the conveyor unit may receive energy from the drive system by having a generator connected to a support wheel of the conveyor unit 1.

Two rooms 24, 25 separated by a wall 26 give room for the power supply for the linear motor drive 27 and for cabling for the control units and means, respectively. The two types of cabling are separated to be in accordance with various safety-regulations. An opening 27 between the two rooms 24, 25 and the covering shield 28 gives room for mounting of additional power supply units, control units, power supply for the energy supply system for the conveyor units 1, etc. The drive chain is driven by means of a linear motor drive comprising a number of stator parts 29 placed along the main track 2 and reaction plates 30 mounted on the drive chain.

The use of a monorail on which the conveyor units 1 run is, especially when the monorail is made from one extruded profile, advantageous as compared to known systems having tracks on both sides of the article-supporting surface. The monorail is more flexible in installation and requires a simpler support arrangement than two parallel tracks and parts of the main track 2 may even be placed on a vertical wall. A monorail having room for the drive chain in the interior and with an opening in the side of the profile permits for vertical half-turns 4 in the path of the main track 2.

The three configurations in FIGS. 3–5 shows different conveyor systems using a monorail. The ones shown in FIGS. 3 and 4 has the conveyor unit 1 and the article-supporting surface 5 arranged on one side of the main track 2, thus permitting for vertical half-turns 4 of the path of the main track 2. The configuration shown in FIG. 3 is suitable for conveying articles of a maximum weight of 5–8 kg, whereas the configuration shown in FIG. 4 is suitable for a maximum weight of 12 kg or more, depending on the size and shape of the protruding arm 31 with which the support wheel 15 engages. The arm 31 makes it possible to make the conveyor more stable in the transversal direction but is also more expensive to either have extruded on the profile or extruded separately and subsequently mounted on the profile. The configuration shown in FIG. 5 is a horizontal configuration which is very stable but does not permit for vertical half-turns 4.

The drive chain on which the conveyor units are mounted is shown in two configurations in FIGS. 6–7 and FIGS. 8–9 for use in a purely horizontal configuration and in a configuration for vertical half-turns 4, respectively. The drive chain comprises a plurality of longer links 32 carrying the reaction plates 30 for the linear motor drive coupled together by two shorter links 33 between each two longer links 32. The short links are pivotally connected to one end of a longer link about pivot pins 34 being substantially vertical and carrying the directing wheels 18, 22 of a diameter of 70 mm for guiding the chain and delimiting slack in the transversal direction. Each pair of two shorter links 33 are pivotally interconnected with a common, substantially horizontal pivot pin 35 carrying the support wheels 14, 15, 36 of a diameter of 47 mm for supporting the conveyor unit 1. Thus, the drive chain is flexible in the vertical plane as well as in the horizontal plane and the support wheels 14, 15 will run correctly without broadsiding through all curves of the main track 2 by forming the drive chain in this manner.

The weight of the conveyor unit 1 and the article supported thereon is during normal operation supported by the reaction force between the surface 13 on the monorail and the associated support wheel 15. The torque caused by the vertical distance between the center of gravity of the conveyor unit 1 and the point of vertical support defined by the wheel 15 and the surface 13 is counteracted by the reaction force between the surface 12 and the associated support wheel 14. Thus, the reaction force between the surface 13 and the wheel 15 counterbalances the gravity force on the conveyor unit 1 (and of the drive chain) as well as the reaction force caused by the torque.

The pivot pin 35 carries the conveyor unit 1 and constitutes the main axis of the conveyor unit about which it pivots during passage of vertical half-turns 4. The support wheel 36 is only engaging a surface 19 of the main track 2 during passage of vertical half-turns 4 where there is not enough room for the surface 13 with which the support wheel 15 engages on straight main track sections. The support wheel 36 is situated at a longer vertical distance from the center of gravity of the conveyor unit 1 and closer to the other support wheel 14 and the support of the conveyor unit 1 is therefore less stable when support wheel 36 takes over the function of support wheel 15 but this effect is counterweighted by the stabilizing influence of the guide means that engages with a guide track at the vertical half-turns 4 as will be described below.

The directing wheels 18, 22 are broad, 70 mm of diameter, so as to allow for as well broad as long reaction plates 30 with a small distance to the directing wheel 22. The reaction plates 30 move as chords to the curve of the main track 2 during passage of vertical half-turns 4 and the dimensions can be made mare suitable if the ends of the reaction plates 30 are able to enter the opening in which the directing wheels 18, 22 runs. The smaller diameter of 47 mm of the support wheels 14, 15, 36 is chosen as a compromise between limiting the dimensions of the extruded profile, which calls for smaller diameter, and minimizing the friction losses between wheels and track, which calls for larger diameter. At least the outer rim of the support wheels 14, 15, 36 and the directing wheels 18, 22 are suitably made from a plastics material of a suitable hardness, such as a hardness in the Shore A range, e.g. Shore 80–100 such as Shore 85–95. An example of such material is polyurethane Shore 90–92 plus/minus 3. It is preferred that the surface of the wheels 14, 15, 36, 18, 22, primary the directing wheels 18, 22, has a low friction coefficient, for which reason the plastics material may comprise about 15% by weight of polytetraflouroethylene.

Figure 8:
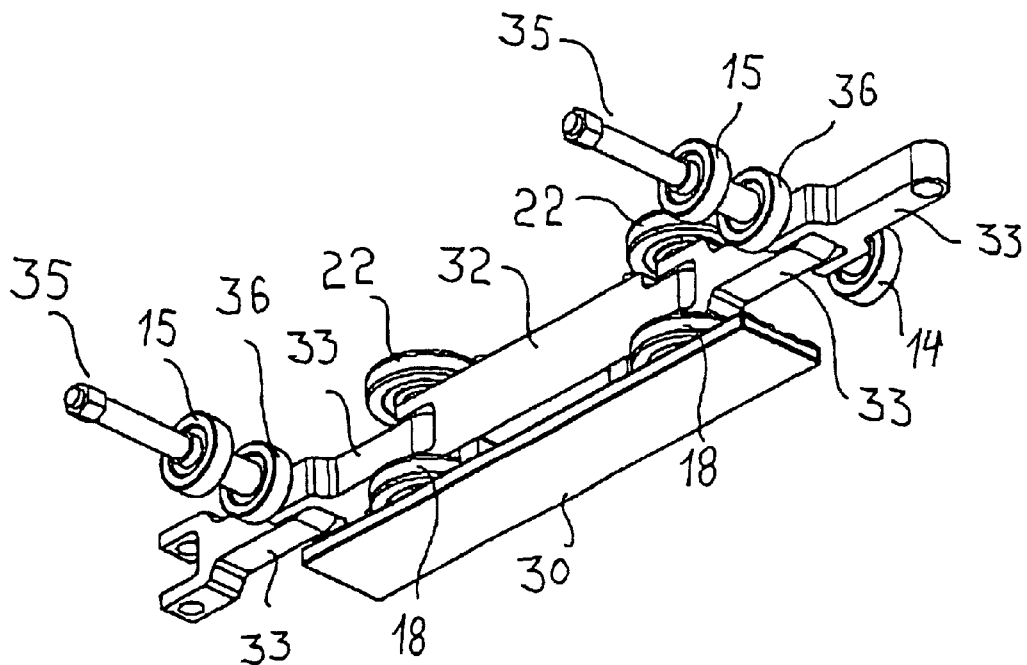
FIG. 8 is a perspective view of a second embodiment of a drive chain as seen partly from below.
Figure 9:
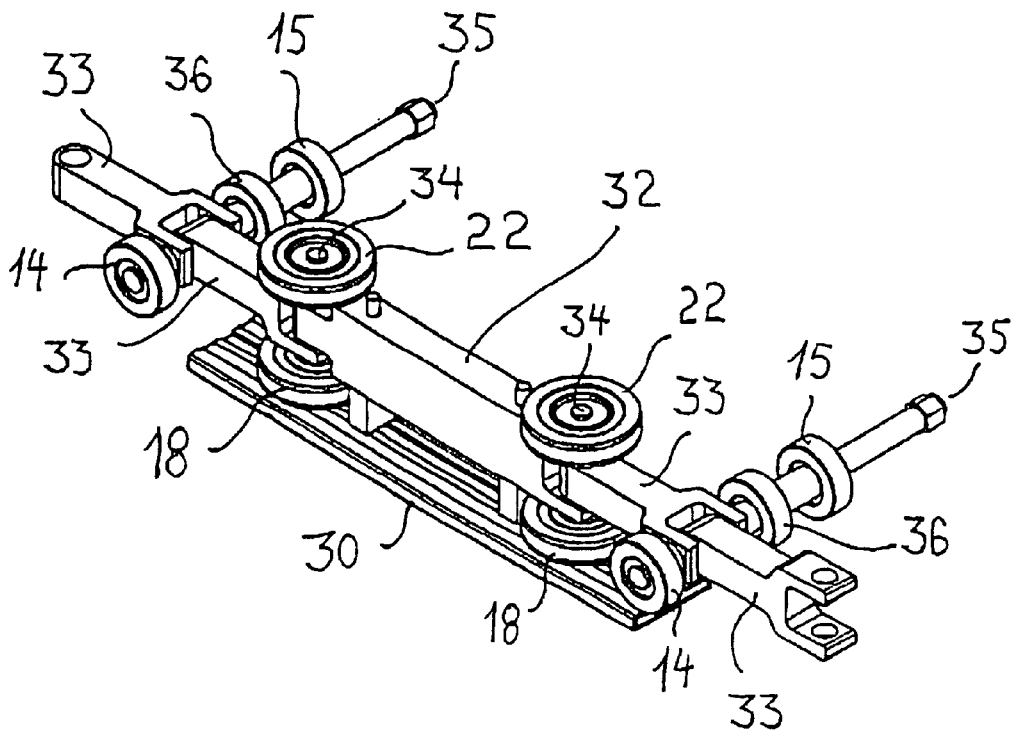
FIG. 9 is a perspective view of a second embodiment of a drive chain as seen partly from above.

The drive chain configuration for vertical half-turns as shown in FIGS. 8–9 has a directing wheel 18, 22 on each side of the vertical pivot pin 34 so that the chain may turn 180 degrees about a transversal axis in a vertical half-turn 4 and still operate in a main track as shown in FIGS. 3–5. Furthermore, the longer links 32 has a second reaction plate 30 (not shown) mounted on the opposite side of the reaction plate 30 shown on FIGS. 8–9 for the same reason. The drive chain for purely horizontal operation it not equipped with these extra directing wheels 22 and reaction plates 30 and does not have the extra support wheel 36.

The drive chains are designed for being flexible in the horizontal plane as well as in the vertical plane and having as long reaction plates 30 as possible to increase the efficiency of the linear drive by delimiting the number of air gaps between consecutive reaction plates 30. The length of the reaction plates 30 is limited by the radius of curvature of the main track because the reaction plates 30 are stiff and move as chords to the curving path of the main track 2 and because the pivot axis of the directing wheels 18, 22 will be non-perpendicular to the curve of the main track during passage of a vertical half-turn 4 for which reason the directing wheels will broadside in their tracks. The broadsiding causes wear on directing wheels 18, 22 and tracks in the vertical half-turns 4 for which reason the surface of the wheels 18, 22 preferably are made from a low-friction material. The deviation from a right angle between the pivot axis of the directing wheels 18, 22 and the curve of the main track depends on the distance between two vertical pivot pins 34 of a longer link 32 and the radius of curvature of the main track section. The deviation should be less than 15 degrees and is in a preferred embodiment between 7 and 11 degrees, such as 9 degrees.

It is essential that the article-supporting surface 5 of the conveyor units 1 is kept horizontal during all operations of the conveyor including passage of vertical half-turns 4 so as to prevent conveyed articles from being accidentally dropped from the article-supporting surfaces 5. The conveyor units 1 are connected to carrier means, the drive chain, with a horizontal pivot pin 35 about which the conveyor unit 1 may pivot. Each conveyor unit 1 is equipped with a first guide member or wheel 37 that engages with a first guiding means, a first track parallel to the main track when the conveyor unit 1 is moving on straight main track sections in order to prevent the conveyor unit 1 and thereby the article-supporting surface 5 from tilting. The first guide wheel 37 disengages with the first guide track when the conveyor unit 1 enters a vertical half-turn 4 and guide means for preventing the conveyor unit 1 from tilting during the passage of the vertical half-turn 4 of the main track 2 comes into action.

Figure 11:
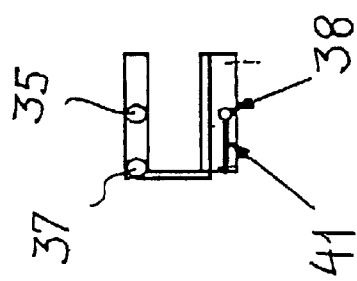
FIG. 11 is a cross-sectional view of a conveyor unit according to the embodiment of FIG. 10.
Figure 12:
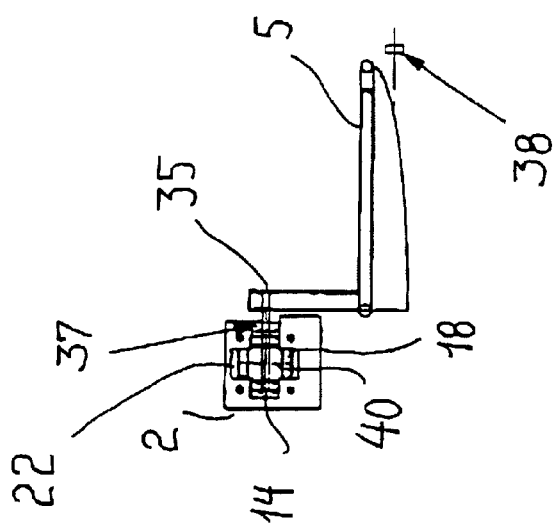
FIG. 12 is a side view of a conveyor unit according to the embodiment of FIG. 10.
Figure 10:
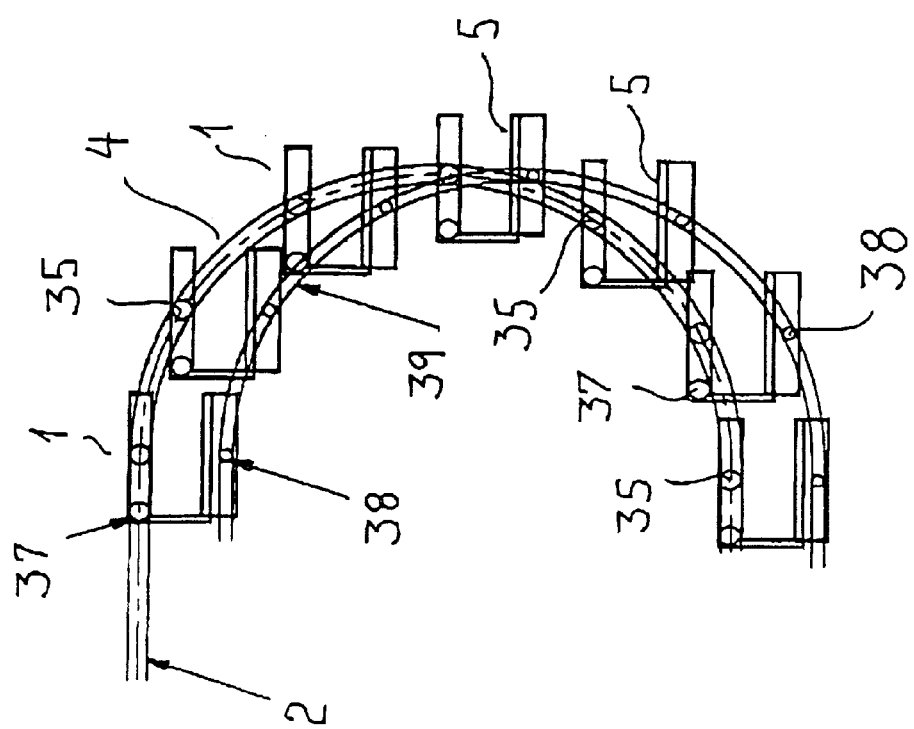
FIG. 10 is a side view of a first embodiment of arrangements for preventing the conveyor units from tilting when passing a vertical half-turn of the main track.

An embodiment having a first guide wheel 37 can be seen in FIGS. 10–12 and the first guide wheel 37 is also shown in the cross-sections in FIGS. 3–5. A number of different embodiments of the guide means at vertical half-turns are shown in FIGS. 10–29. The first guide wheel is arranged in the same horizontal plane as the support wheels 14, 15, 36 but with a horizontal distance in the transport direction of the conveyor to the pivot pin 35. The first guide track is preferably displaced in the transverse direction of the conveyor relatively to the surface 13 on which the support wheels 15 engage so as to enable individual engagement of the two wheels 15, 37.

One arrangement according to the invention for preserving a horizontal position of the article-supporting surface 5 of the conveyor units 1 at a vertically curving section 4 of the main track 2 is shown on FIGS. 10–12.

The first guide wheel 37 of the conveyor section disengages with the first guide track when the conveyor unit 1 enters a vertical half-turn 4 of the main track 2 and a second guide wheel 38 engages with a second guide track 39. The second guide wheel 38 and the second guide track 39 prevents, due to the design of the second guide track 39, the conveyor unit 1 from tilting when it moves on vertical half-turns 4 of the main track 2. The second guide wheel 38 disengages again with the second guide track 39 when the conveyor unit 1 leaves the vertical half-turns 4 of the main track section 2 and the first guide wheel 37 engages the fist guide track. Both guiding wheels 37, 39 are simultaneously engaging with their respective guide tracks over a short distance when the conveyor unit 1 moves into or out from the vertical half-turns 4 of the main track section 2 so as to ensure stability of The conveyor unit 1.

A conveyor unit 1 according to the embodiment of the invention as shown in FIG. 10 is shown in FIGS. 11 and 12. The second guide wheel 38 and the second guide track 39 are arranged in a vertical plane parallel to the vertical plane of the carrier means 40 but displaced in the transverse direction so that the conveyor unit 1 passes between the two vertical planes when it moves on the vertical half-turns 4 of the main track 2. With this arrangement, the path in The vertical plane of the second guide track 39 may cross The path of the curving main track section 4.

The second guide wheel 38 is preferably mounted on the conveyor unit 1 with a resilient bar 41 as shown in FIG. 12 in order to obtain an improved stability of the conveyor system.

The article-supporting surface 5 is in the embodiment shown in FIG. 11 arranged in a horizontal plane below the main track 2 so that the articles that are discharged to that side pass under the main track 2. An alternative embodiment where the article-supporting surface 5 is arranged in a horizontal plane above the main track 2 is shown in e.g. FIG. 16 which imposes less restrictions on the height of the transported articles.

Figure 14:
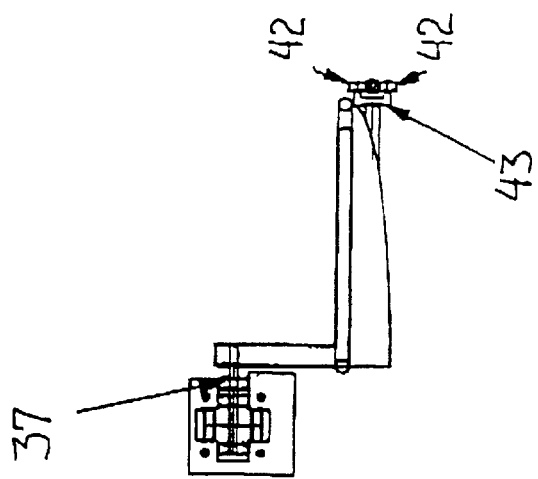
FIG. 14 is a cross-sectional view of a conveyor unit according to the embodiment of FIG. 13.
Figure 13:
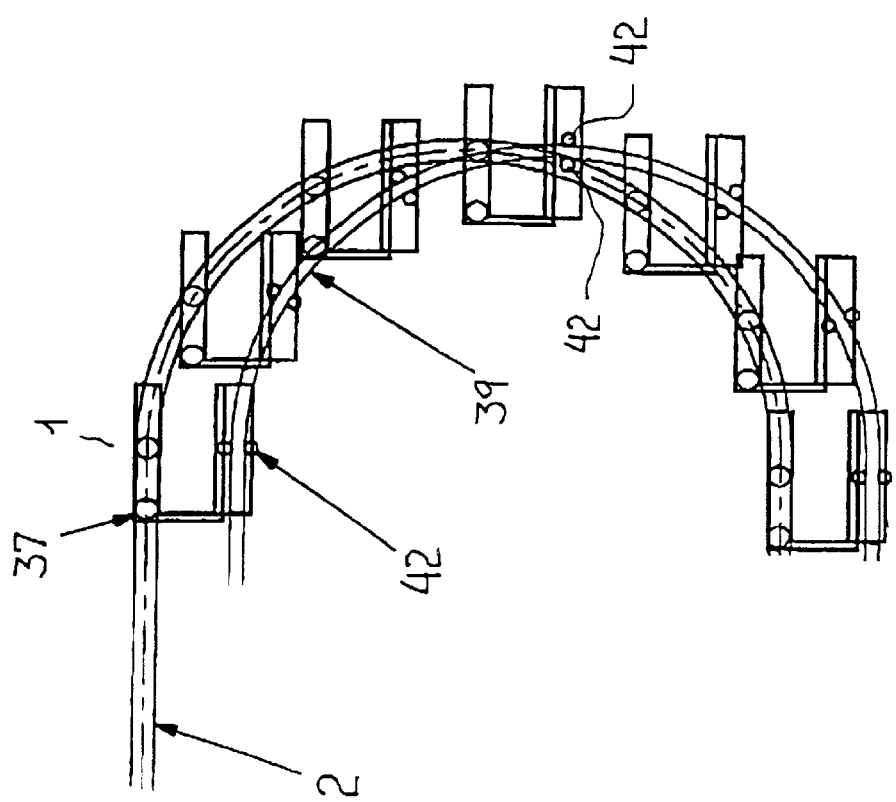
FIG. 13 is a side view of a second embodiment of arrangements for preventing the conveyor units from tilting when passing a vertical half-turn of the main track.

Another embodiment of the invention is shown in FIGS. 13 and 14. Instead of having a second guide wheel 38, this embodiment has an arrangement with two wheels 42 arranged on a bar 43 that pivotally connected to the conveyor unit 1. The two wheels 42 are engaging each side of a second guide track 39 and the wheels 42 are preferably resiliently biased towards the second guide track 39.

Further modifications of the embodiment as shown in FIGS. 10–12 are shown in FIGS. 15–16 and FIGS. 17–18. The embodiment shown in FIGS. 15–16 comprises a third guide wheel 44 and a third support track 45.

The second and third guide wheels 38, 44 are positioned on the conveyor unit 1 so that they are not on line with the pivot pin 35, the axis of the wheels 38, 44 and the pin 35 are rather forming an obtuse-angled triangle in a vertical plane, so as to prevent the conveyor unit 1 from having any positions along a vertical half-turn 4 of the main track 2 at which the unit 1 may rotate or tilt in a vertical plane. The embodiment shown in FIGS. 17–18 further comprises a fourth guide wheel 46 and a fourth guide track 47, the fourth guide wheel 46 having substantially the same axis of rotation as the pivot pin 35 and the fourth guide track 47 follows the path of the main track 2 but in a vertical near the plane of the second and third guide tracks 39, 45. The fourth guide wheel 46 substantially prevents the conveyor unit 1 from rotating or tilting in the plane of the tracks 2, 39, 45 during passage of a vertical half-turn 4 of the main track 2, due so slack or clearance in the various wheels and tracks and/or in the carrier means 40.

Figure 22:
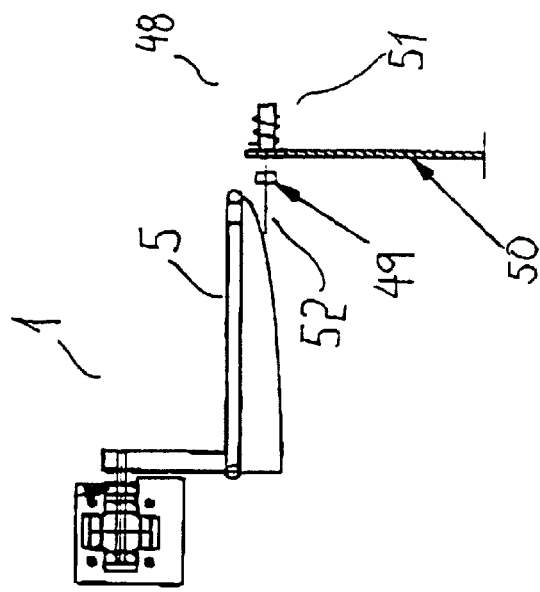
FIG. 22 is a cross-sectional view of a conveyor unit according to the embodiment of FIG. 21.
Figure 24:
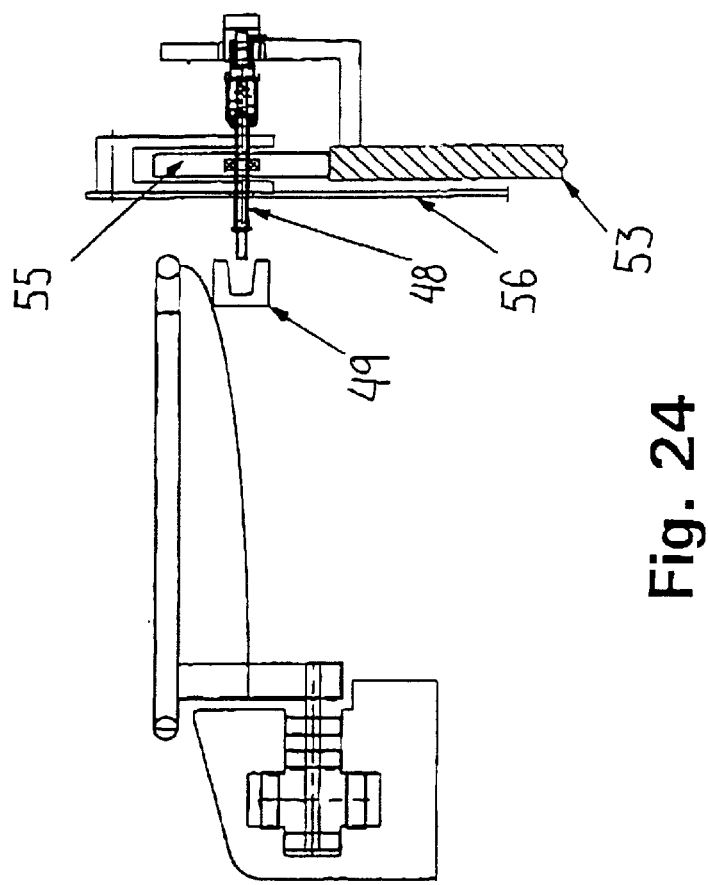
FIG. 24 is a cross-sectional view of a conveyor unit according to the embodiment of FIG. 23.
Figure 23:
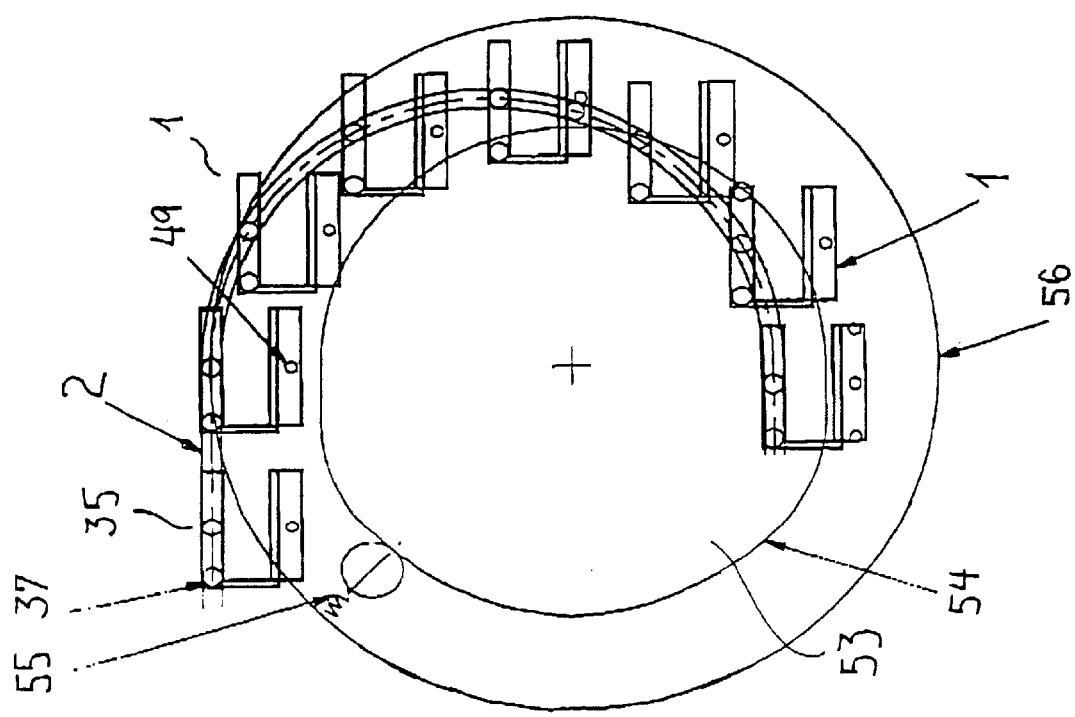
FIG. 23 is a side view of a seventh embodiment of arrangements for preventing the conveyor units from tilting when passing a vertical half-turn of the main track.

Yet another four embodiments of the invention are shown in FIGS. 19–20, FIGS. 21–22. FIGS. 23–24 and in FIGS. 25–26. These embodiments all comprise a synchronizing means arranged in a vertical plane parallel to the vertical plane of the carrier means 40. The synchronizing means comprises a plurality of coupling means 48, such as, e.g. rods, adapted for engaging with a guide member 49, such as, e.g. a member with a indentation, of each conveyor unit 1 when the conveyor unit 1 enters a vertical half-turn 4 of the main track 2. The distance between immediately adjacent coupling means 48 is substantially equal to the distance between the guide members 49 of immediately adjacent conveyor units 1 and the path along which the synchronization means moves the coupling means 48 relative to the main track 2 adapts the arrangement for preventing the conveyor units 1 from tilting when they pass a vertical half-turn 4 of the main track 2. The synchronization means are in all embodiments driven by the engagement with the conveyor units 1. The embodiments further comprises a guide wheel 37 on each conveyor unit 1 which disengages with a guide track when the conveyor unit 1 enters a vertical half-turn 4 of the main track 2.

Figure 20:
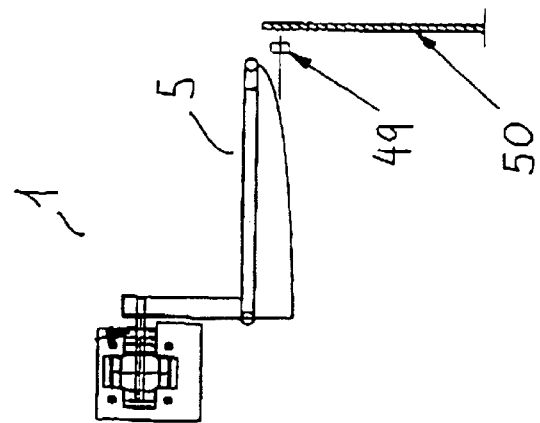
FIG. 20 is a cross-sectional view of a conveyor unit according to the embodiment of FIG. 19.
Figure 19:
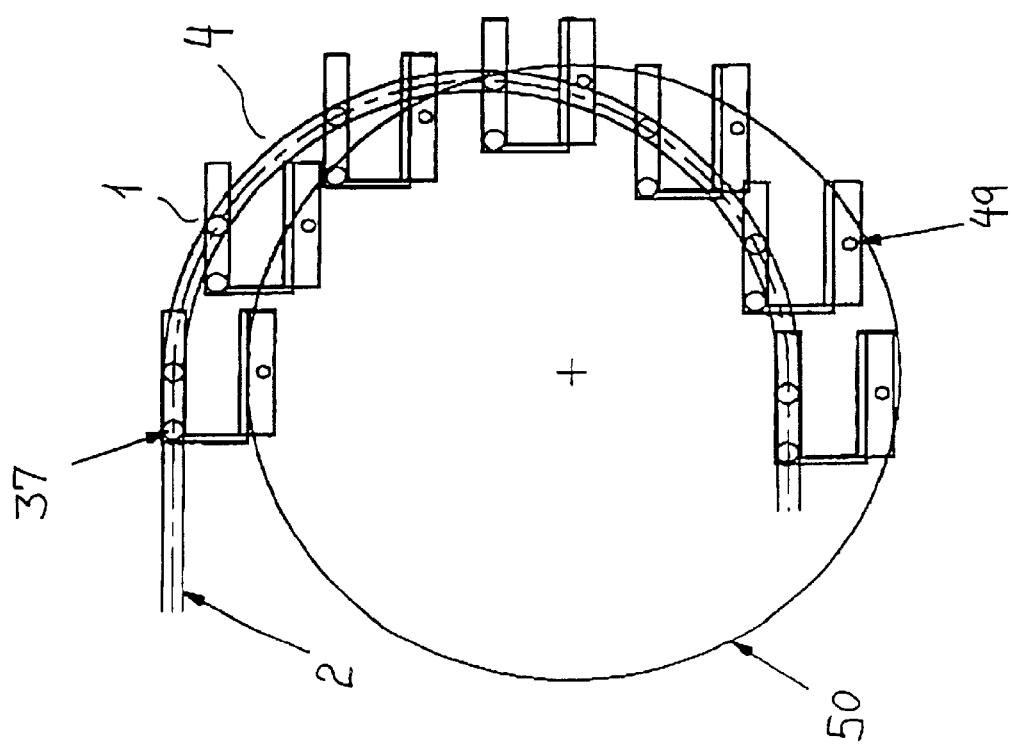
FIG. 19 is a side view of a fifth embodiment of arrangements for preventing the conveyor units from tilting when passing a vertical half-turn of the main track.
Figure 21:
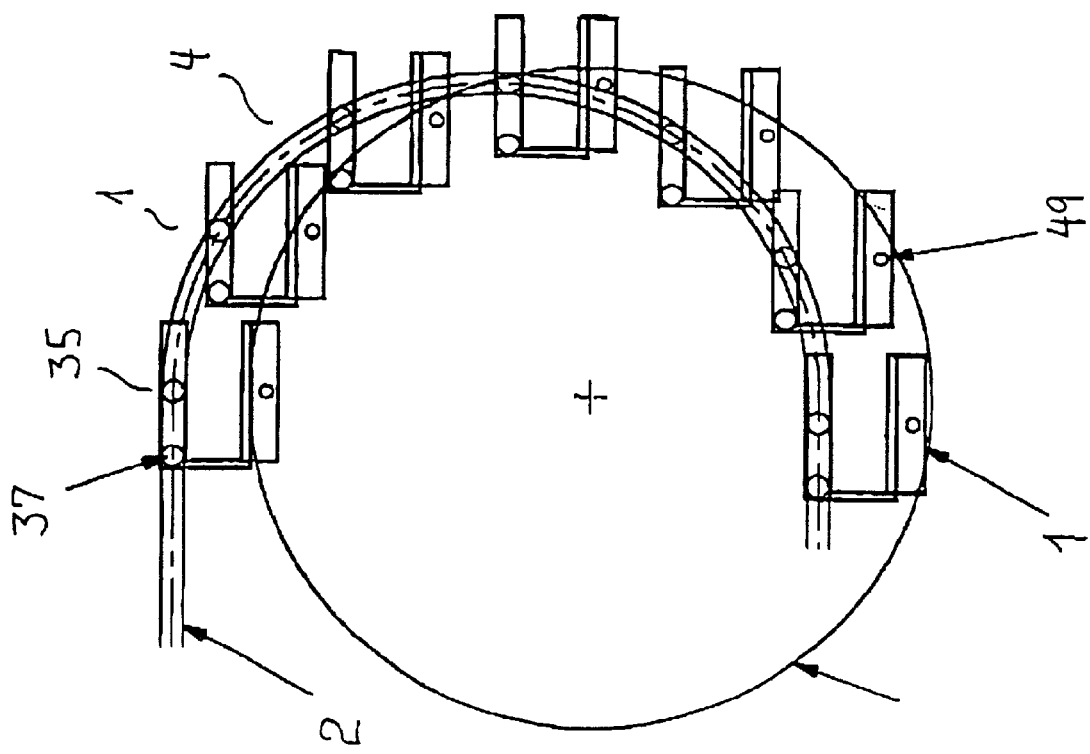
FIG. 21 is a side view of a sixth embodiment of arrangements for preventing the conveyor units from tilting when passing a vertical half-turn of the main track.

One of these four embodiments of guide means at a vertical half-turn of the main track 2 is shown in FIGS. 19–20. The synchronization means comprises a disc member 50 arranged pivotally about a horizontal axis and the coupling means 48 are arranged on the disc member 50. According to the second embodiment as shown in FIGS. 21–22, the coupling means 48 comprises electromagnets 51 that are activated to couple with a magnetic component of the guide members 49 of each conveyor unit 1. The magnetic component of the guide member 49 is arranged so that it may rotate about an axis 52 being parallel to the axis of the pivot pin 35.

The embodiment shown on FIGS. 23–24 has a synchronization means comprising a non-moving part 53 with an outer surface 54 that defines a path or track for the synchronization wheels 55. The synchronization wheels 55 each guides a coupling means 48 that is resiliently biased towards the surface 54 by a disc member 56 that also keeps the predetermined distance between the coupling means 48.

Figure 26:
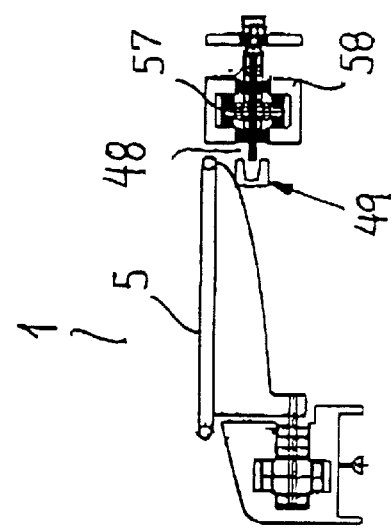
FIG. 26 is a cross-sectional view of a conveyor unit according to the embodiment of FIG. 25.
Figure 25:
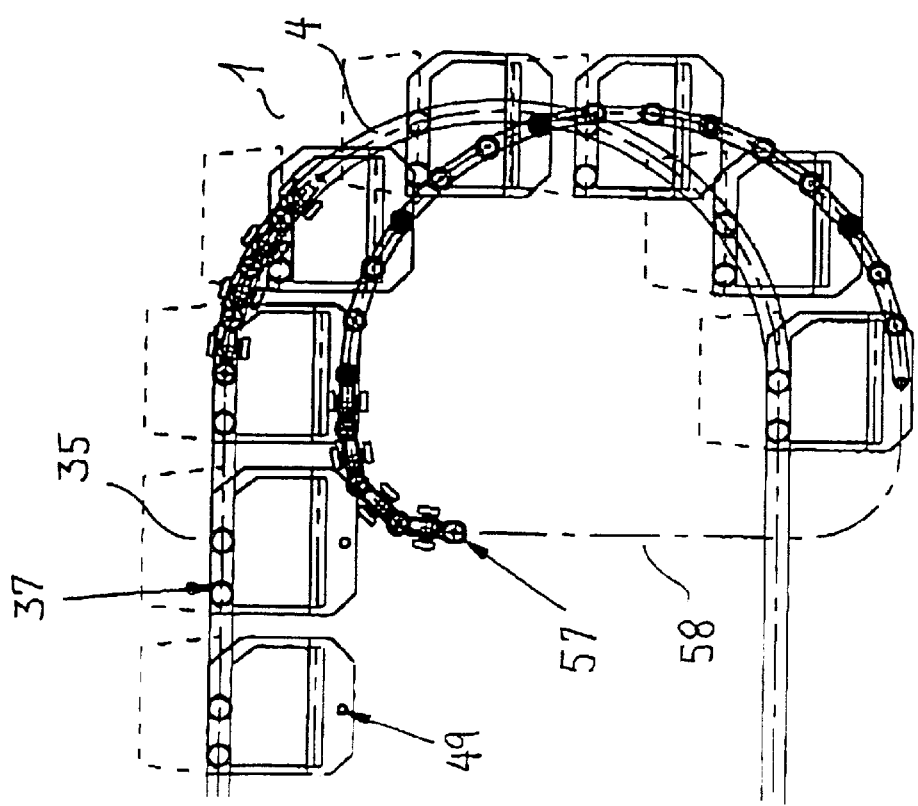
FIG. 25 is a side view of an eighth embodiment of arrangements for preventing the conveyor units from tilting when passing a vertical half-turn of the main track.

The last of the four embodiments is shown in FIGS. 25–26. The synchronization means of this embodiment is more flexible than the previous three and comprises a synchronization chain 57 on which the coupling means 48 are arranged. The synchronization chain 57 moves in a synchronization track 58 that may follow any path that the main track 2 may follow and does therefore not require that the vertical half-turn 4 of the main track 2 follows a semi-circular path.

Figure 18:
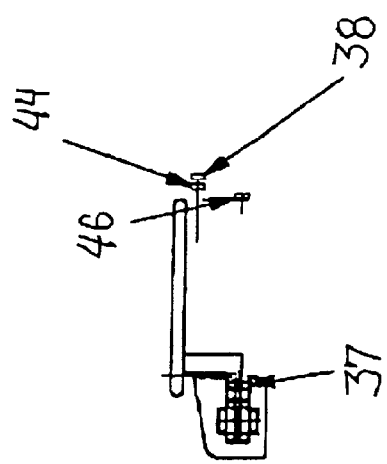
FIG. 18 is a cross-sectional view of a conveyor unit according to the embodiment of FIG. 17.
Figure 17:
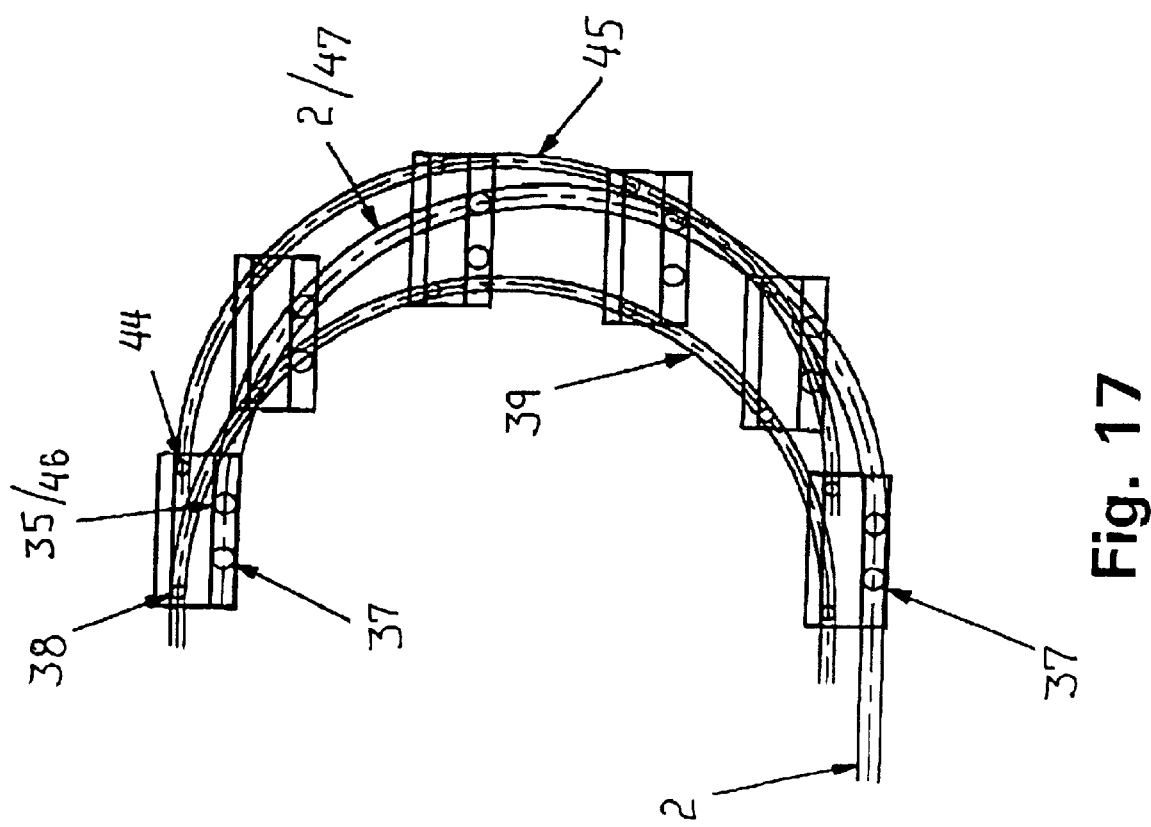
FIG. 17 is a side view of a fourth embodiment of arrangements for preventing the conveyor units from tilting when passing a vertical half-turn of the main track.
Figure 27:
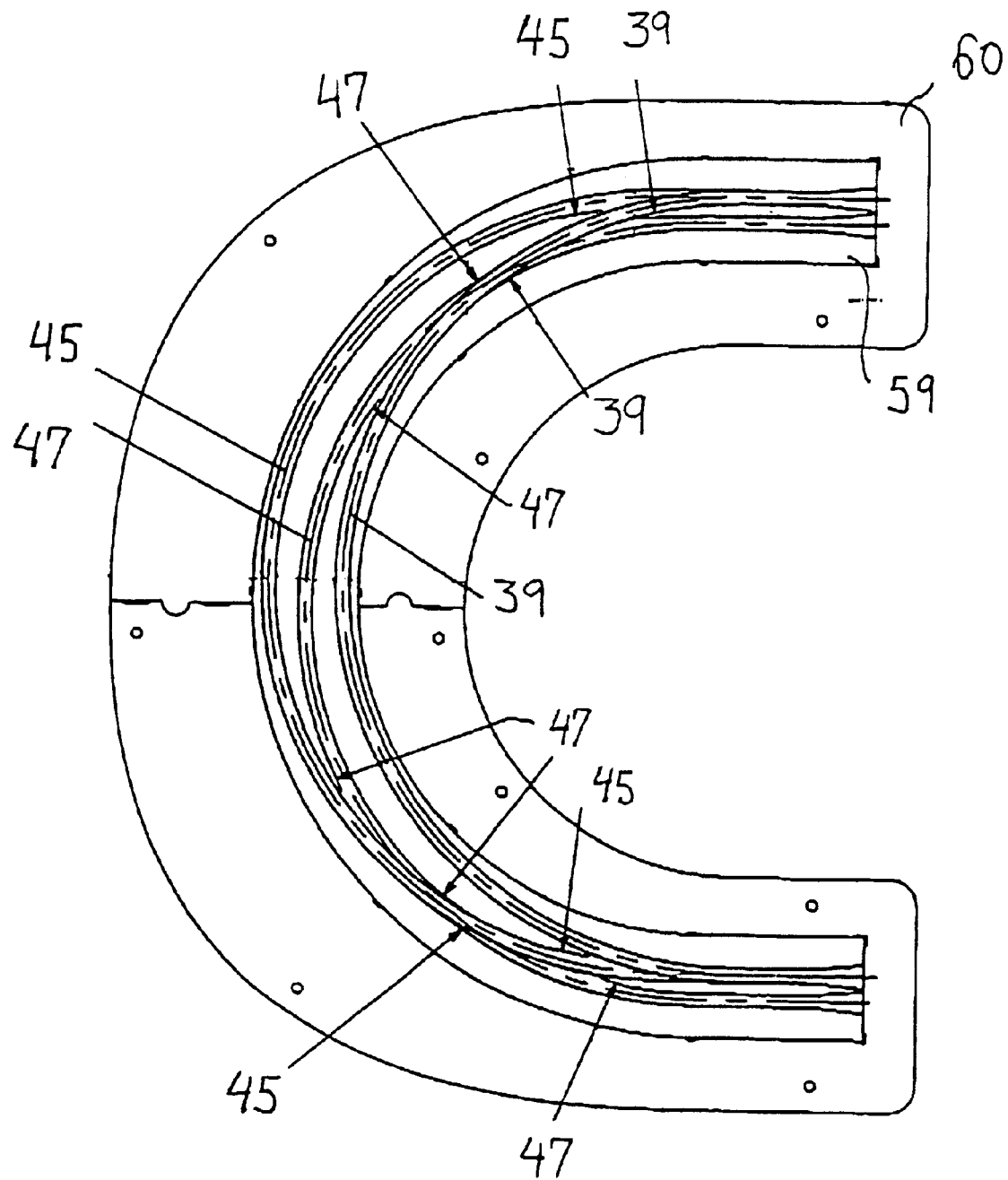
FIG. 27 is a side view of a preferred embodiment of an arrangement for preventing the conveyor units from tilting when passing a vertical half-turn of the main track.

A preferred embodiment of an arrangement for preventing the conveyor units 1 from turning or tilting when passing a vertical half-turn 4 of the main track 2 is shown in FIGS. 27–30. The embodiment resembles the one shown in FIGS. 17–18 with the exception that it is not mandatory in the preferred embodiment that the fourth guide wheel 46 has substantially the same axis of rotation as the pivot pin 35. The second 38, third 44 and fourth guide wheels 46 are arranged in an obtuse-angled triangle in each their adjacent vertical planes as shown in FIG. 18 so that the respective guide tracks 39, 45, 47 may cross each other. The path of the guide tracks 39, 45, 47 is shown in FIG. 27. The guide tracks 39, 45, 47 are formed by rolling an aluminum bar 59 into the correct shape, fasten it to a support plate 60 and form the tracks 39, 45, 47 by milling the bar 59. The bar with the tracks 39, 45, 47 is shown mounted together with the main track 2 at a vertical half-turn 4 of the main track 2 in FIGS. 28 and 29 as viewed from two sides.

Figure 29:
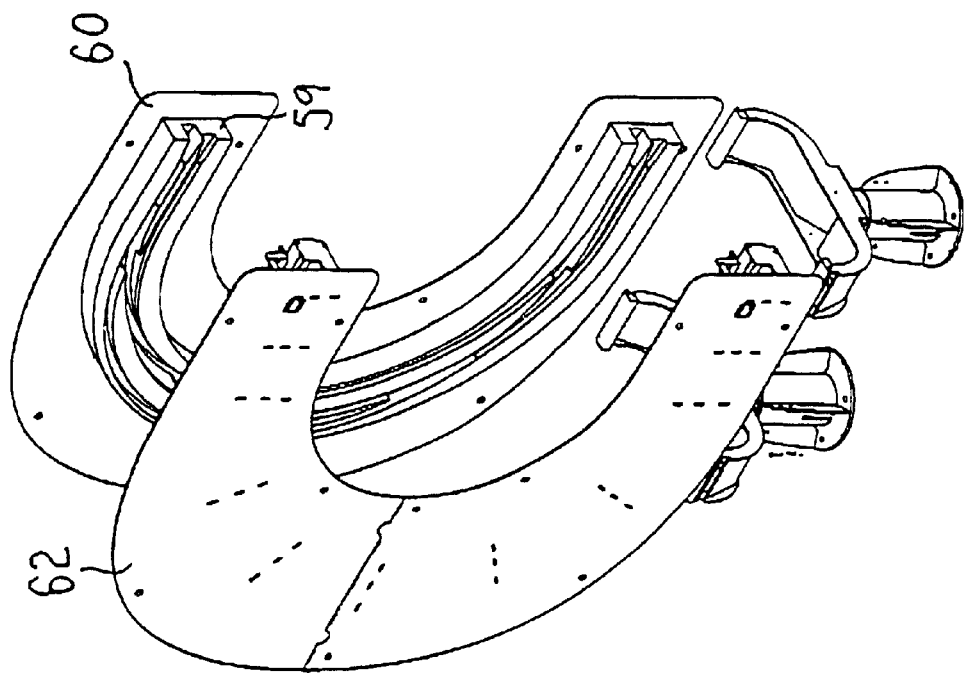
FIG. 29 is a second perspective view of the arrangement of FIGS. 27 and 28.
Figure 28:
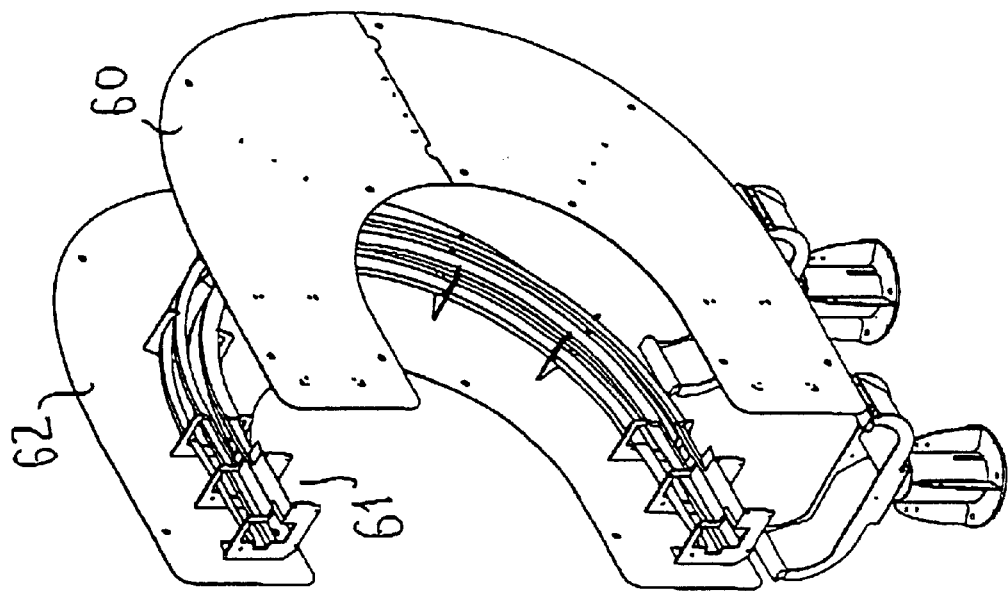
FIG. 28 is a first perspective view of the arrangement of FIG. 27.

The main track 2 at a vertical half-turn 4 of the main track 2 is formed from rolled profiles 61 shaped so that the drive chain is suitably supported when passing the half-turn 4. The directing wheel 18, 22 of the drive chain being closest to the point of curvature is the one engaging the track. It has shown to be advantageous to obtain a low-friction contact between the directing wheel 18, 22 and the track at the vertical half-turn 4 because the wheel 18, 22 will broadside during the passage of the half-turn as described previously. A suitable way of decreasing the friction factor of the surface of the track is to provide it with a layer of polyamide such as polyamide 6 preferably by spraying it on the tracks. The milled profiles 61 forming the main track 2 are mounted on a support plate 62 as shown in FIGS. 28–29.

Figure 30:
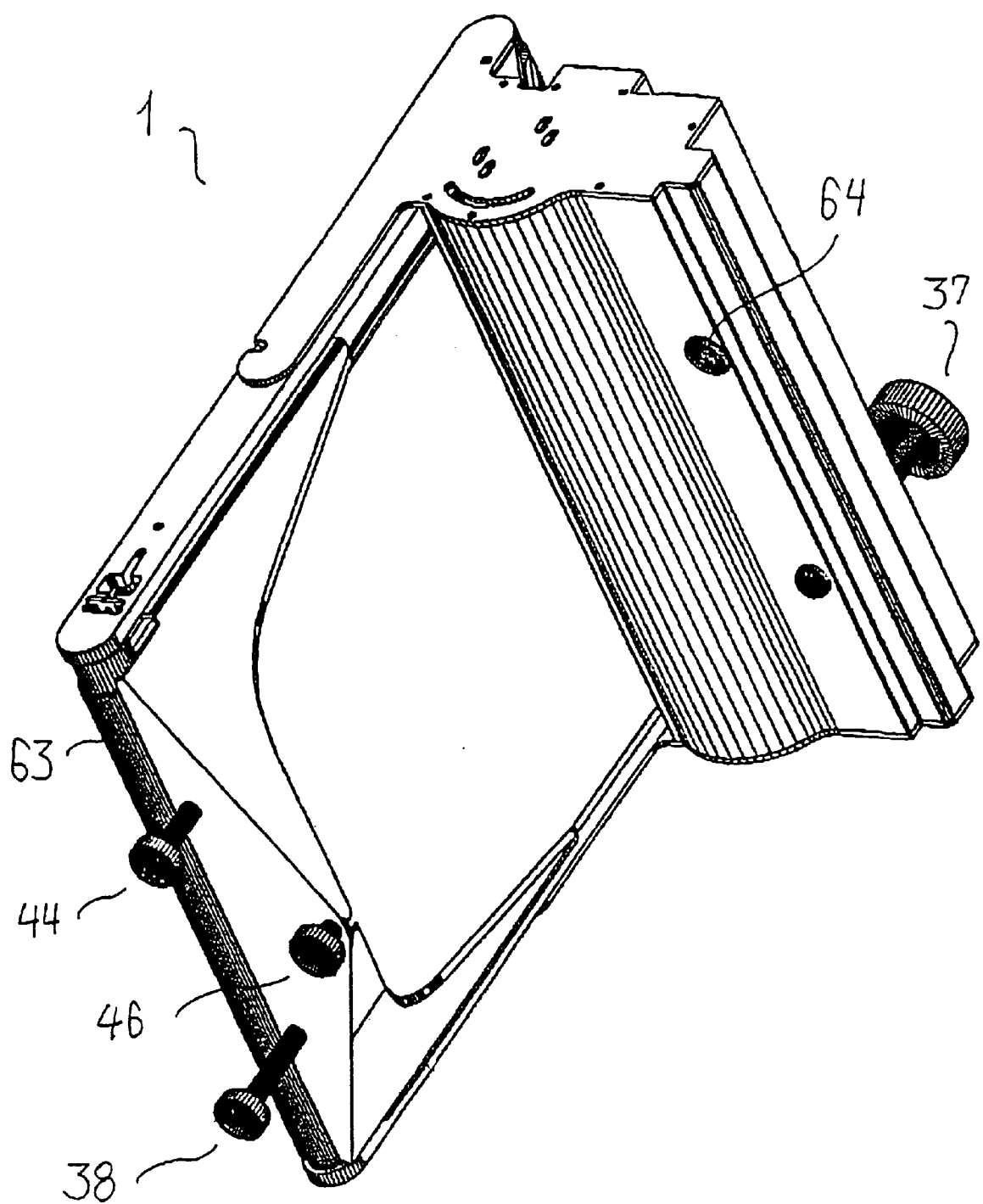
FIG. 30 is a perspective view of a first conveyor unit.
Figure 31:
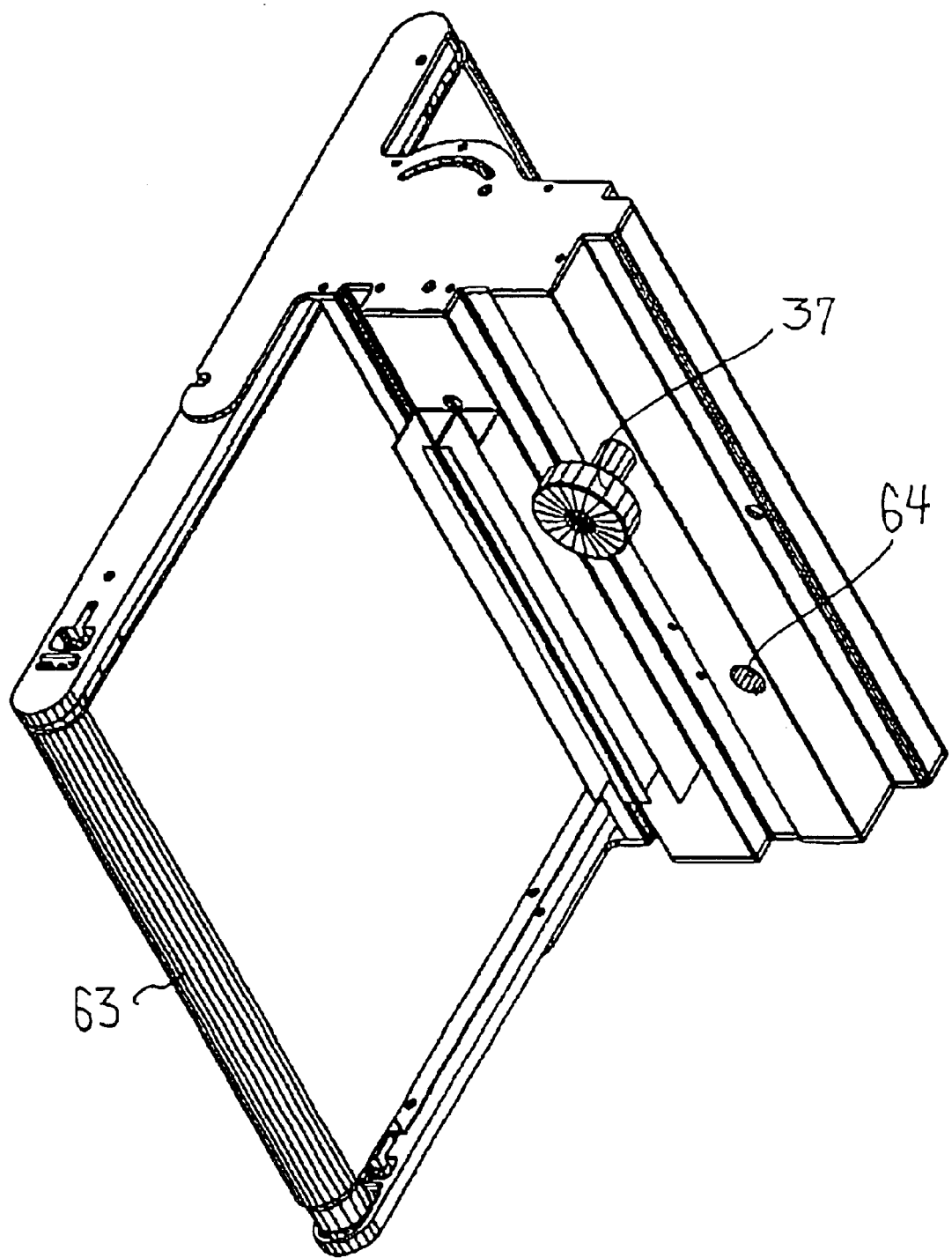
FIG. 31 is a perspective view of a second conveyor unit.
Figure 32:
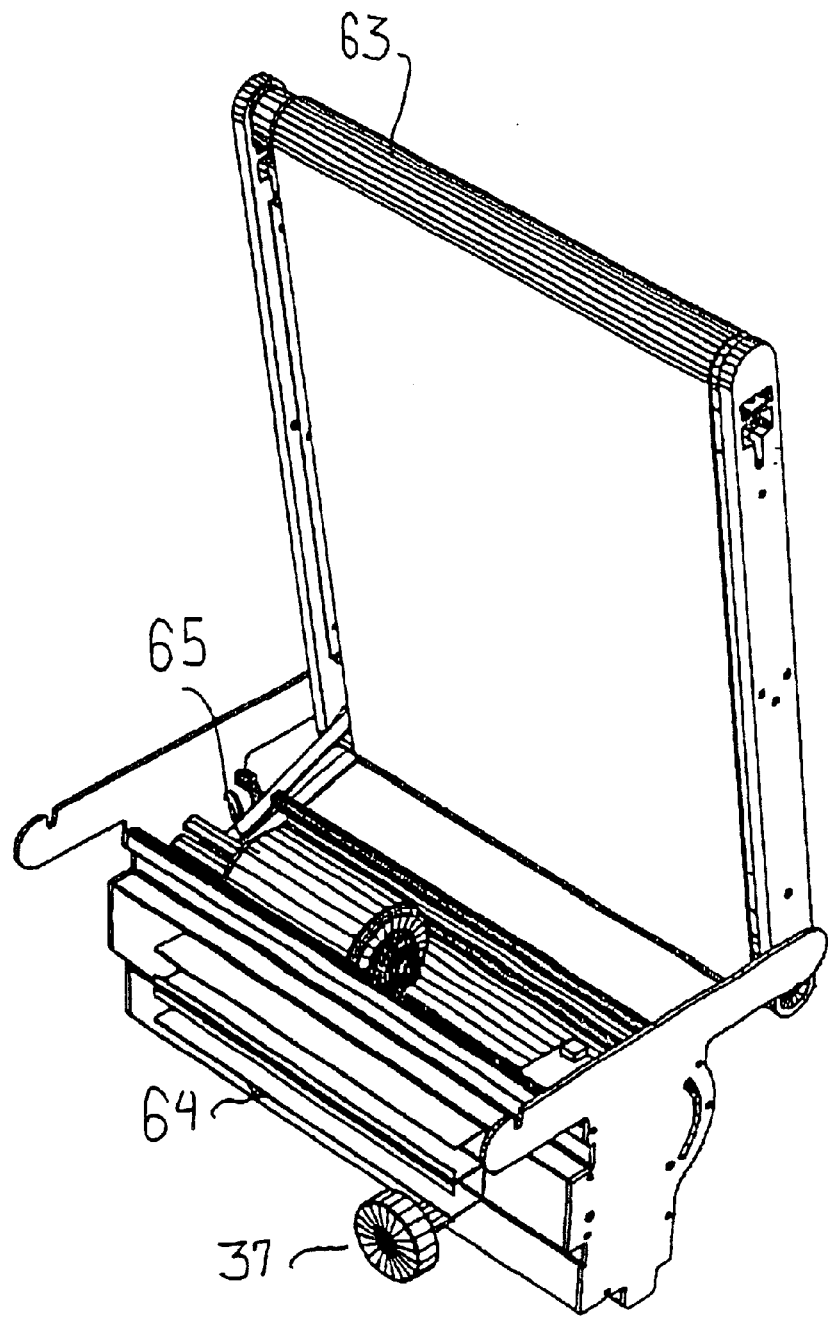
FIG. 32 is a perspective view of a conveyor unit with the cross-belt part hinged to a frame part of the conveyor unit.

Three conveyor units 1 are shown in FIGS. 30–32, each being equipped with a cross-belt 63 forming the article-supporting surface 5 of the conveyor units 5, a first guide wheel 37 and an opening 64 for engaging pivotally with the pivot pin 35. The conveyor unit 1 shown in FIG. 30 is suitable for use in a system with vertical half-turns 4 of the main track 2 whereas the one shown in FIG. 31 is suited for a purely horizontal configuration. The part of the conveyor unit 1 carrying the cross-belt 63 is preferably hinged to a frame part of the conveyor unit 1 as shown in FIG. 32 so as to provide easy access to the interior of the frame part wherein the drive motor 65 for driving the cross-belt 63 is placed together with a control unit and an electric storage battery so that the power supply to the conveyor unit may be temporarily during its passage of the main track 2.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A conveyor for transporting articles and comprising:

a plurality of conveyor units;

endless carrier means to which each conveyor unit is connected, each of the conveyor units being connected to the endless carrier means and supported on on a single side thereof;

an endless main track in which the carrier means is moving in a transport direction, said main track comprising at least a first substantially straight main track section, a second substantially straight main track section, and a curving main track section being connected at a first end to the first main track section and at a second end to the second main track section, the first and second main track sections being arranged in respective first and second levels in the same vertical plane so that their respective transport directions are of opposite direction, the carrier means residing in substantially a single vertical plane at the curving main track section each conveyor unit being connected pivotally to the carrier means so as to allow the conveyor unit to pivot relatively to the endless carrier means about a main axis of the conveyor unit, the main axis being substantially horizontal and substantially perpendicular to the endless carrier means, each conveyor unit comprising a plurality of guide members including a first guide member, and an article-supporting member, the article-supporting member extends away from the vertical plane of the carrier means; and a plurality of guiding means comprising first guiding means arranged in a vertical plane being parallel to the vertical plane of the carrier means and adapted to co-operate with the first guide member of each of said plurality of conveyor units when the conveyor unit moves along at least a part of the at least one curving section of said main track, so as to counteract or prevent the article supporting member from tilting from its position relative to the horizontal plane, the article supporting members of the conveyor units being between the vertical planes of the plurality of guiding means and the vertical plane of the carrier means when the conveyor units are moving along said curving main track section.

2. The conveyor according to claim 1, comprising second guiding means that extends substantially parallel to at least a substantial part of the main track, each conveyor unit comprises a second guide member adapted to co-operate with said second guiding means when the conveyor unit moves along at least a substantial part of straight sections of said main track, the second guiding means and the second guide members when co-operating are adapted to counteract or prevent the article-supporting member from tilting from its position relative to the horizontal plane.

3. The conveyor according to claim 2, wherein the first and second guide members of each conveyor unit and the first and second guiding means are adapted so that the first guide member co-operates with the first guiding means when the conveyor unit enters the curving main track section and before the second guide member disengages with the second guiding means and so that the second guide member co-operates with the second guiding means when the conveyor unit leaves the curving main track section and before the first guide member disengages with the first guiding means.

4. The conveyor according to claim 1, comprising torque-absorbing means arranged in substantially the same vertical plane as the carrier means, said torque-absorbing means being adapted to absorb a torque applied by the conveyor units about an axis being substantially parallel to the transport direction.

5. The conveyor according to claim 4, wherein the torque-absorbing means constitutes an integrated part of the carrier means.

6. The conveyor according to claim 1, wherein the first and the second main track sections are substantially horizontal.

7. The conveyor according to claim 1, wherein each article-supporting member has a substantially horizontal article-supporting upper surface.

8. The conveyor according to claim 2, wherein the second guide member and the second guiding means are arranged in substantially the same vertical plane as the carrier means or in a vertical plane closely adjacent to said plane.

9. The conveyor according to claim 1, wherein the first guide member of at least one conveyor unit comprises two wheels arranged in substantially the same vertical plane with a spacing in between and arranged pivotally on a bar being pivotally arranged on the conveyor unit about an common axis that extends substantially midway between and substantially parallel to the axes of said two wheels, said common axis being substantially parallel to the main axis of the conveyor unit, the first guiding means comprising a track protruding from a vertical plane and comprising two parallel surfaces with which said two wheels co-operate with said track in between said two wheels when the first guide member co-operates with the first guiding means.

10. The conveyor according to claim 9, wherein at least one of said two wheels of the first guide member is resiliently biased against said track of the first guiding means when the first guide member co-operates with the first guiding means.

11. The conveyor according to claim 2, further comprising third guiding means arranged in substantially in the same vertical plane as the first guiding means, each conveyor unit comprises a third guide member adapted to co-operate with said third guiding means, the second and third guiding means being adapted so that the third guide member co-operates with the third guiding means when the conveyor unit enters the curving main track section and before the second guide member disengages with the second guiding means and so that the second guide member cooperates with the second guiding means when the conveyor unit leaves the curving main track section and before the third guide member disengages with the third guiding means.

12. The conveyor according to claim 11, further comprising fourth guiding means arranged in substantially in the same vertical plane as the first guiding means, each conveyor unit comprises a fourth guide member adapted to co-operate with said fourth guiding means, the first, third and fourth guiding members of each conveyor unit forming an obtuse-angled triangle in a vertical plane.

13. The conveyor according to claim 11, wherein the first, second and third guide members of each conveyor unit and the first, second and third guiding means being adapted so that the first guide member co-operates with the first guiding means when the conveyor unit enters the curving main track section and before the second guide member disengages with the second guiding means, so that the third guide member co-operates with the third guiding means before the first guide member disengages with the first guiding means when the conveyor unit passes a given position along the curving main track section, and so that the second guide member co-operates with the second guiding means when the conveyor unit leaves the curving main track section and before the third guide member disengages with the third guiding means.

14. The conveyor according to claim 1, wherein the first guiding means comprises a plurality of coupling devices arranged on a common synchronizing device, each coupling device being adapted to co-operate with one first guide member of a conveyor unit when the conveyor unit enters the curving main track section and to disengage with the first guide member when the conveyor unit leaves the curving main track section, the coupling devices being arranged on the synchronizing device with a distance between immediately adjacent coupling devices substantially equal to the distance between the first guide members of immediately adjacent conveyor units.

15. The conveyor according to claim 14, wherein the curving main track section is shaped substantially as an arc of a circle when projected on the vertical plane of the carrier means, and where the synchronizing device comprises a disc member which is pivotally arranged about an axis being substantially parallel to the main axes of the conveyor units, on which disc member the coupling devices are arranged substantially in a circle with center at the pivot axis of the disc member.

16. The conveyor according to claim 15, wherein the first guide member of each conveyor unit comprises a guide component made form a magnetic susceptible material, the guide component being arranged to pivot about an axis being substantially parallel to the main axis of the conveyor unit, and the coupling devices each comprises an electromagnet, the synchronizing device further comprises means for providing power supply to the coupling devices and means for controlling the activation and deactivation of the electromagnet of each coupling device.

17. The conveyor according to claim 14, wherein the synchronizing device comprises an endless synchronizing chain on which the coupling devices are arranged, and wherein the first guiding member further comprises a synchronizing track in which the synchronizing chain is moving.

18. The conveyor according to claim 14, wherein the synchronizing device comprises an endless synchronizing track on which a plurality of synchronizing wheels each comprising a coupling device is moving and wherein the synchronizing wheels are kept with a substantially equal distance between immediately adjacent synchronizing wheels and are resiliently biased towards said track by a disc member which is allowed to rotate about an axis that is substantially parallel to the first axes of the conveyor units when these are moving on the curving main track.

* * * * *